(12) United States Patent
Krasner et al.

(10) Patent No.: US 11,392,306 B2
(45) Date of Patent: Jul. 19, 2022

(54) USING STORAGE SYSTEM MEMORY AS HOST MEMORY

(71) Applicant: EMC IP Holding Company LLC, Hopkinton, MA (US)

(72) Inventors: Jon I. Krasner, Coventry, RI (US); Arieh Don, Newton, MA (US); Yaron Dar, Sudbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 35 days.

(21) Appl. No.: 16/864,824

(22) Filed: May 1, 2020

(65) Prior Publication Data

US 2021/0342078 A1 Nov. 4, 2021

(51) Int. Cl.
*G06F 12/00* (2006.01)
*G06F 3/06* (2006.01)
*G06F 15/173* (2006.01)

(52) U.S. Cl.
CPC .......... *G06F 3/0631* (2013.01); *G06F 3/0604* (2013.01); *G06F 3/065* (2013.01); *G06F 3/067* (2013.01); *G06F 15/17331* (2013.01)

(58) Field of Classification Search
None
See application file for complete search history.

(56) References Cited

U.S. PATENT DOCUMENTS

| | | | |
|---|---|---|---|
| 10,698,613 B1 | 6/2020 | Wigmore et al. | |
| 10,698,844 B1 | 6/2020 | Wigmore et al. | |
| 10,740,259 B1 | 8/2020 | Wigmore et al. | |
| 11,151,063 B2 | 10/2021 | Wigmore et al. | |
| 11,157,184 B2 | 10/2021 | Chanler et al. | |
| 2002/0087751 A1* | 7/2002 | Chong, Jr. | G06F 3/0635 710/33 |
| 2005/0038850 A1* | 2/2005 | Oe | G06F 3/067 709/203 |
| 2018/0341429 A1* | 11/2018 | Bolkhovitin | G06F 3/0659 |
| 2020/0042475 A1* | 2/2020 | Venkataramani | G06F 3/0665 |
| 2020/0333964 A1 | 10/2020 | Wigmore et al. | |
| 2021/0034499 A1 | 2/2021 | Hershkovitz et al. | |
| 2021/0149579 A1* | 5/2021 | Devriendt | G06F 3/0635 |
| 2021/0157660 A1 | 5/2021 | Hershkovitz et al. | |

\* cited by examiner

*Primary Examiner* — Jason W Blust
(74) *Attorney, Agent, or Firm* — Muirhead and Saturnelli, LLC

(57) ABSTRACT

Memory of a storage system is made available (i.e., exposed) for use as host memory of a host, for example, as an extension of the main memory of the host. The host may be directly connected to an internal fabric of the data storage system. Portions of the storage system memory (SSM) may be allocated for use as host memory, and this may be communicated to the host system. The host OS and applications executing thereon then may make use of the SSM as if it were memory of the host system, for example, as second-tier persistent memory. The amount of SSM made available may be dynamically increased and decreased. The SSM may be accessed by the host system as memory; i.e., in accordance with memory-based instructions, for example, using remote direct memory access instructions. The SSM may be write protected using mirroring, vaulting and other techniques.

20 Claims, 8 Drawing Sheets

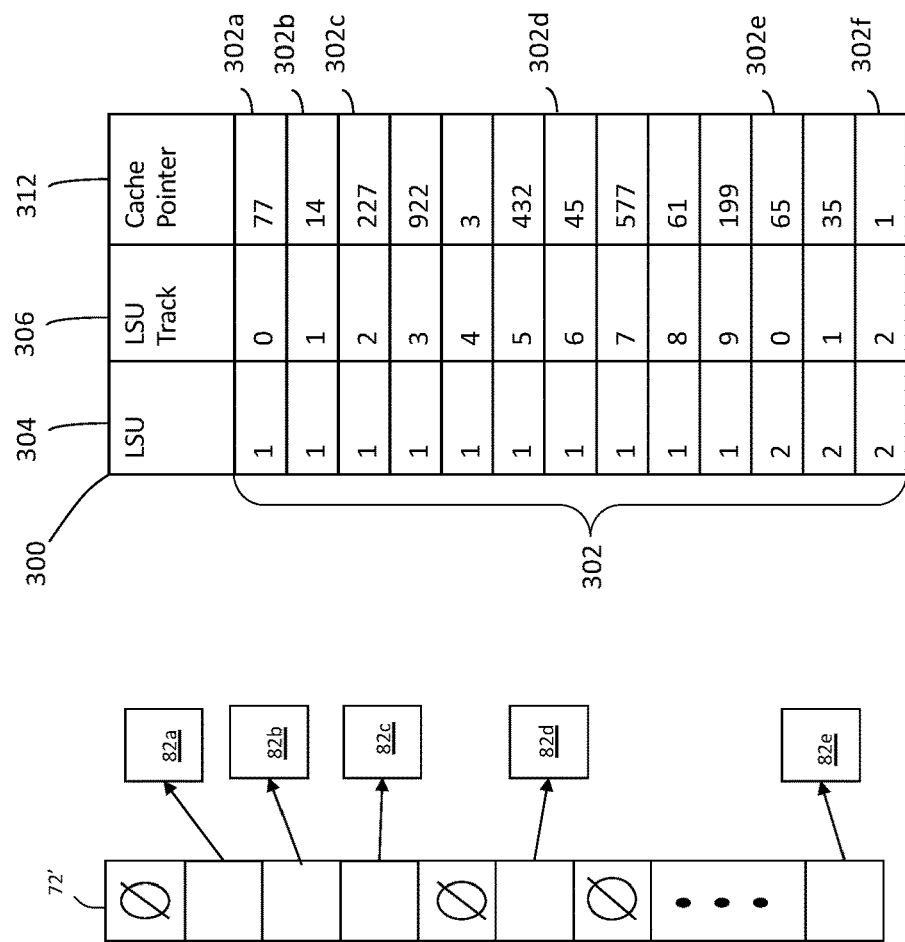

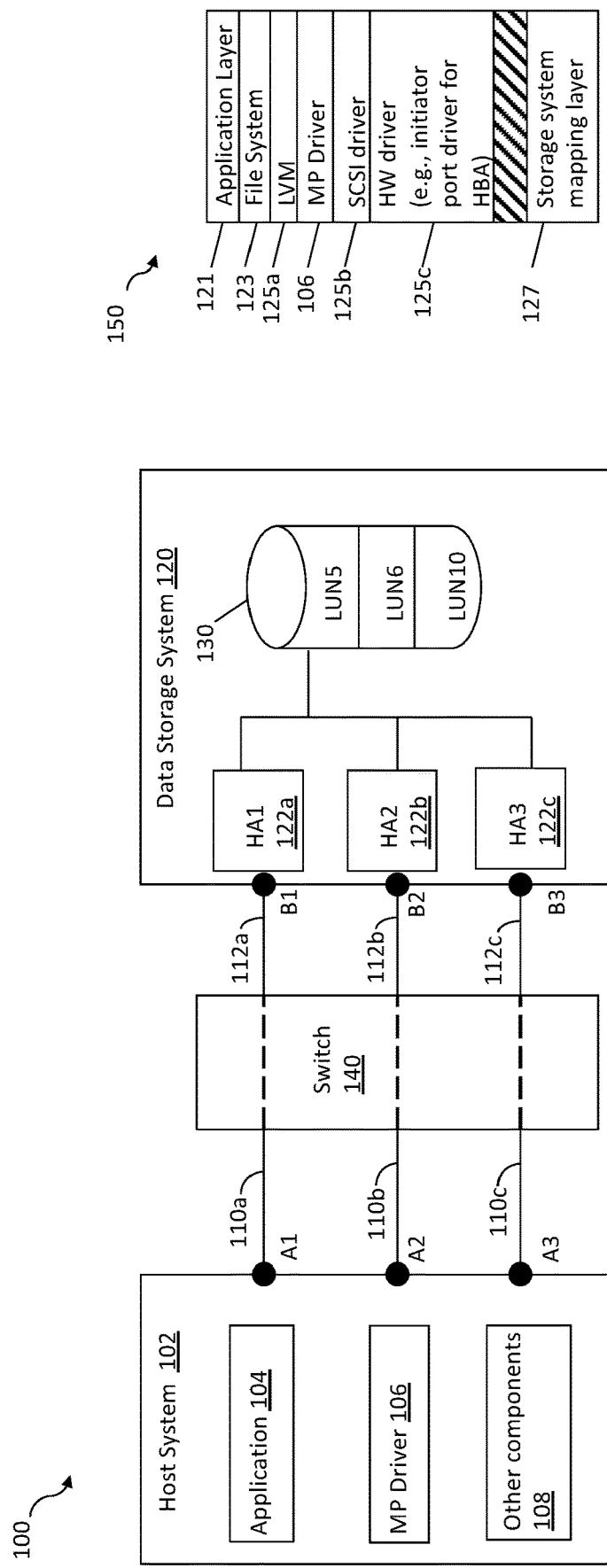

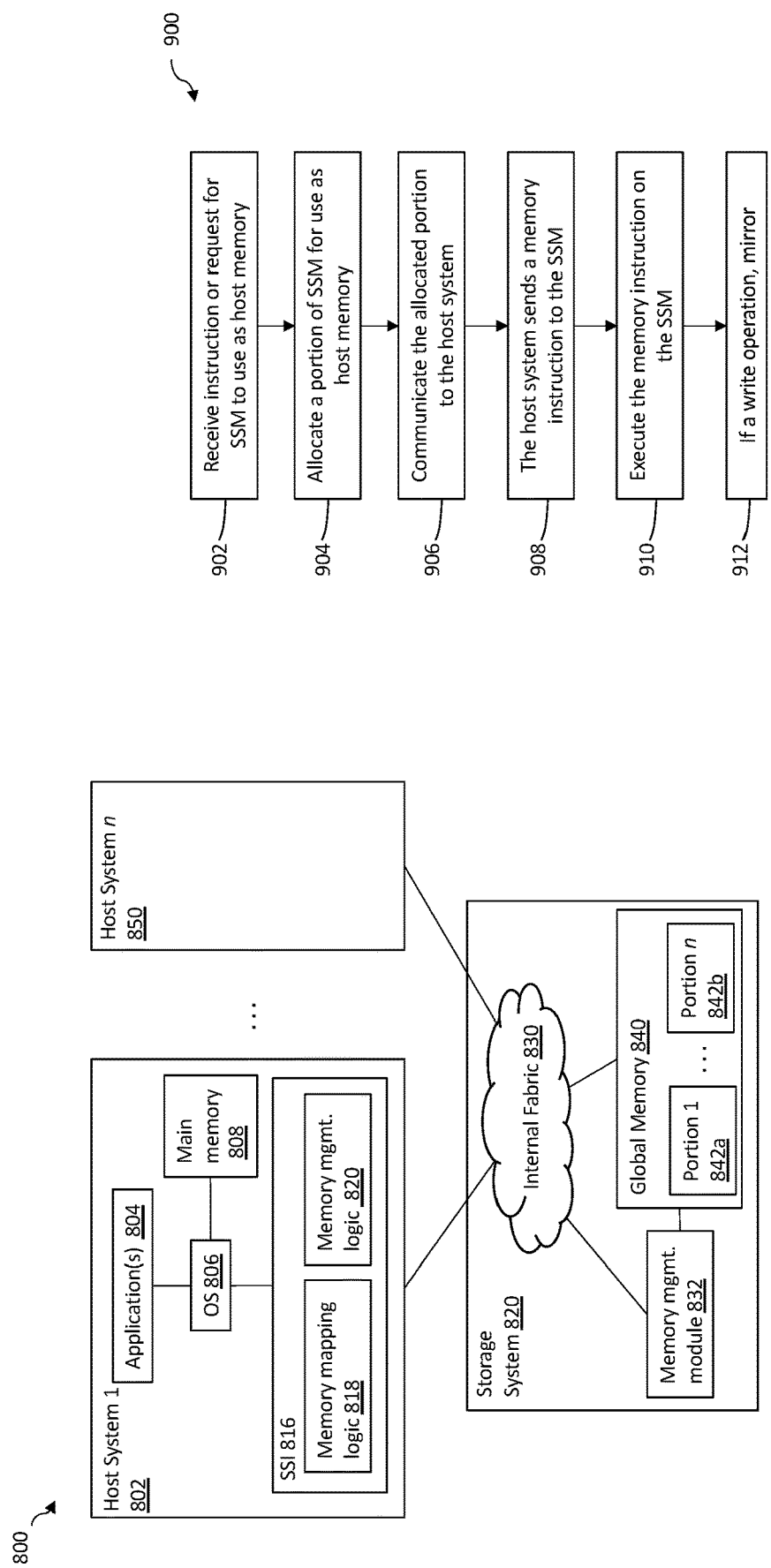

USING STORAGE SYSTEM MEMORY AS HOST MEMORY

BACKGROUND

Technical Field

This application generally relates to data storage systems, and more particularly to use of storage system memory as host memory.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (IO) operations utilizing a physical storage device of the storage system, one or more components of the host system, storage system and network components therebetween may be used.

Host systems may not address the physical storage devices (e.g., disk drives or flash drives) of a storage systems directly, but rather access to data may be provided to one or more host systems from what the host systems view as a plurality of logical storage units (LSUs) including, for example, logical blocks, logical devices (also referred to as logical volumes, LUNs, logical storage units and/or logical disks), thin devices, groups of logical devices (e.g., storage groups), NVMe namespaces, and other types of LSUs. LSUs are described in more detail elsewhere herein.

SUMMARY OF THE INVENTION

In an embodiment of the invention, a method is performed for a data storage network including a data storage system and one or more host systems on which a plurality of applications execute, the data storage system including a memory. The method includes allocating a first portion of the memory for use as host memory by a first of the one or more host systems, sending a communication to the first host system informing the first host system that the first portion is available for use by the first host system a host memory, and executing a memory instruction on the first portion for a first data, the memory instruction originating from the host system. The method may further include the memory receiving a remote direct memory access request from the host system, the direct memory access request including the memory instruction for the first data. The data storage system may include an internal switching fabric to which the memory is connected, and the host system may include a storage system interface directly connected to the switching fabric independent of any director, and the method may further include sending the memory instruction directly from the storage system interface over the internal fabric independent of a director and/or IO protocol. The method may further include mirroring the first data portion on the data storage system, and/or allocating a second portion of the first memory for use as host memory by a second of the one or more host systems. Execution of a first application may be distributed across a plurality of host systems, including the first host system and the second host system, and the first data portion is data resulting from execution of the first application, and the method may further include storing second data in the second portion of memory, where the second data results from execution of the first application on the second host system. The method may further include dynamically modifying an amount of the memory allocated for use as host memory by the first host.

In another embodiments of the invention, a system is provided for a data storage network including a data storage system and one or more host systems on which a plurality of applications execute, the data storage system including a memory. The system includes a data storage system including memory, and executable logic that implements a method including allocating a first portion of the memory for use as host memory by a first host system having applications executing thereon, sending a communication to the first host system informing the first host system that the first portion is available for use by the first host system a host memory, and executing a memory instruction on the first portion for a first data, the memory instruction originating from the host system. The method may include the memory receiving a remote direct memory access request from the host system, the direct memory access request including the memory instruction for the first data. The data storage system may include an internal switching fabric to which the memory is connected, and the host system may include a storage system interface directly connected to the switching fabric independent of any director, and the method may further include sending the memory instruction directly from the storage system interface over the internal fabric independent of a director and/or IO protocol. The method further may further include mirroring the first data portion on the data storage system and/or allocating a second portion of the first memory for use as host memory by a second of the one or more host systems. The execution of a first application may be distributed across a plurality of host systems, including the first host system and the second host system, and the first data portion may be data resulting from execution of the first application, and the method may further include storing second data in the second portion of memory, where the second data results from execution of the first application on the second host system. The method may further include dynamically modifying an amount of the memory allocated for use as host memory by the first host.

In another embodiment of the invention, computer-readable media may be provided for a data storage network including a data storage system and one or more host systems on which a plurality of applications execute, the data storage system including a memory. The computer-readable media has software stored thereon including executable code that allocating a first portion of the memory for use as host memory by the first host system, executable code that sends a communication to the first host system informing the first host system that the first portion is available for use by the first host system a host memory, and executable code that executes a memory instruction on the first portion for a first data, the memory instruction originating from the host system. The software further may include executable code that controls the memory receiving a remote direct memory access request from the host system, the direct memory access request including the memory instruction for the first data. The data storage system may include an internal switching fabric to which the memory is connected, the host system may include a storage system interface directly connected to the switching fabric independent of any director, and the software further may include executable code that sends the memory instruction directly from the storage system interface over the internal fabric independent of a director and/or IO protocol. The software may further include executable code that mirrors the first data portion on the data storage system, executable code that allocates a second portion of the first memory for use as host memory by a second of the one or more host systems, and/or executable code that dynamically modifies an amount of the memory allocated for use as host memory by the first host.

BRIEF DESCRIPTION OF THE DRAWINGS

Features and advantages of the present invention will become more apparent from the following detailed description of illustrative embodiments thereof taken in conjunction with the accompanying drawings in which:

FIG. 3B a block diagram illustrating an example of a table used for a thin logical device, according to embodiments of the invention;

FIG. 3C is a block diagram illustrating an example of a data structure for mapping logical storage unit tracks to cache slots, according to embodiments of the invention;

FIG. 3D is a block diagram illustrating an example of a data structure defining port connectivity permissions between a storage system and one or more host systems, according to embodiments of the invention;

FIG. 4 is a block diagram illustrating an example of a system including a host system communicatively coupled to a data storage system via multiple IO paths, according to embodiments of the invention;

FIG. 5 is a block diagram illustrating an example of a plurality of logical layers of a combination of a host system and a data storage system for processing an IO request, according to embodiments of the invention;

FIG. 8 is a block diagram illustrating an example of a system for using storage system memory as host memory, according to embodiments of the invention; and FIG. 9 is a flowchart illustrating an example of a method of using storage system memory as host memory, according to embodiments of the invention.

DETAILED DESCRIPTION OF EMBODIMENTS

Figure 1:
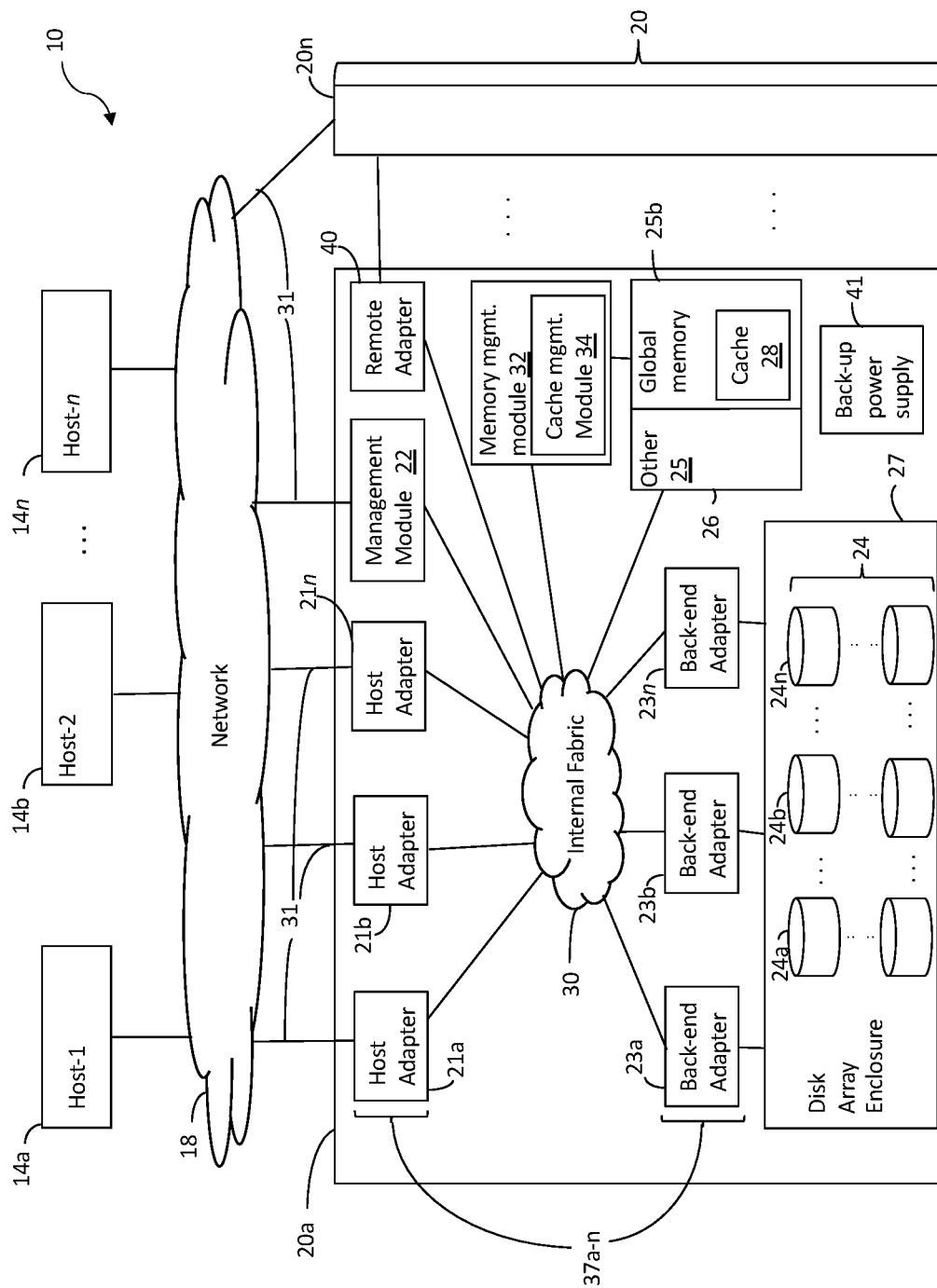
FIG. 1 is a block diagram illustrating an example of a data storage network, according to embodiments of the invention.

A host system (i.e., server) may include one or more CPUs that each has its own internal volatile memory used for internal functions of the CPU (e.g., registers and cache), typically implemented with SRAM memory technology. The typical main memory of a host system (external to the CPU(s)) used for shorter-term, temporary storing of data while executing applications, often referred to as "RAM," is typically implemented using volatile DRAM memory technology, which is slower and less expensive than SRAM, but faster and more expensive than non-volatile random-access memory (NVRAM). The capacity of the main memory may be increased by adding one or more physically discrete memory components (e.g., memory cards) to the host system. The added memory may be any of a variety of types of memory, including volatile memory (e.g., DRAM) or NVRAM. NVRAM may include flash memory as well as more recently developed storage class memory (SCM) including, for example, 3D XPoint (e.g., Intel® Optane™ memory) and resistive RAM (ReRAM)). NVRAM is slower and typically cheaper than DRAM, albeit SCM technology has significantly reduced the differences in speed.

When the added memory is of a different type than the native main memory (e.g., DRAM) of the host system, for example, when the added memory is NVRAM, the operating system (OS) of the host and/or one or more applications executing on the host system, may be configured to be aware of the different types of the memory and to utilize the native main memory (often referred to herein as "native memory") and added memory differently based on their respective properties, including speed (i.e., access time) and volatility (i.e., being volatile or non-volatile). For example, the added memory may be treated as a second tier of memory—the native memory (and perhaps other added memory of the same type as the native memory) being the first tier. A second tier of memory may be referred to herein as "2T memory." In the case where the 2T memory is NVRAM, the 2T memory may be utilized as persistent memory for which data stored thereon (including state information) persists (i.e., remains available) after the process or program that created the data terminates, perhaps even after the host system and/or the 2T memory components fails.

Many host applications today are distributed applications, whose execution is distributed across multiple host systems, for example, multiple servers of a server cluster. For example, a database application, such as those available from Oracle Corporation and other companies, may be a distributed database application. Such distributed applications may not be configured to coordinate coherency of the data stored in 2T memory of a two-tier memory architecture (e.g., using memory locks or other techniques) such that it may only be feasible to use the 2T memory as read-only memory. Further, the 2T memory itself may not be inherently capable of being shared between multiple instances of applications running on multiple hosts (e.g., the 2T memory may not be configured to be cluster-aware).

Another potential drawback of added memory (i.e., memory added to the native memory of a host system or other computer)—whether treated as 2T memory or otherwise—is that it is static; i.e., fixed in size such that the capacity is limited by the amount of memory included on the physical component (e.g., memory card). As a result, if the amount needed by a host system—e.g., to support the one or more applications executing on it—exceeds the memory capacity of the physical component, then an additional physical memory component may need to be acquired, installed, configured and allocated. On the other hand, the memory capacity of the added physical memory component may exceed (perhaps significantly) the memory demands of the host system, in which case much of the capacity (and the money spend to acquire it) may be wasted.

Yet another potential drawback of added memory is that it may not provide write protection such that data written to the added memory is recoverable in the event of a failure or other fault of the host system and/or the added memory itself. The potential drawbacks presented by a lack of write protection and the fixed size of added memory may be particularly significant for certain types of applications, for example in-memory databases, for which relatively large amounts of memory may be needed and some form of write protection expected.

What is desired in the ability to expand the memory capacity of a host system without manifesting the aforementioned potential drawbacks.

Described herein are mechanisms and techniques in which memory of a storage system is made available (i.e., exposed) for use as host memory of one or more hosts, for example, as an extension of the main memory of one or more hosts.

In some embodiments, portions of the global memory of a storage system—which is typically used for internal storage operations, including caching I/O data, managing metadata and other functions—may allocated for use as host memory. The memory that is allocated may be persistent memory, as described in more detail herein. The storage system may communicate the availability of these portions of memory to one or more host systems, e.g., to the OSs of the host(s); i.e., may expose or present the memory to the host system. Each host OS and applications executing thereon then may make use of the storage system memory (SSM) as if it were memory of the host system. The host system may make use of SSM as 2T memory, for example, as persistent memory in embodiments in which the SSM is configured to be persistent. The SSM memory may be accessed by the host system as memory; i.e., in accordance with memory-based instructions, for example, using remote direct memory access (RDMA) actions. That is, the host system may access the SSM as memory, as opposed to accessing the SSM as part of IO processing in which IO communications may be exchanged with the storage system using IO protocols and components configured to implement IO protocols.

The amount of the SSM made available to the host system may exceed (e.g., significantly) the amount of memory that could be added to the host system by conventional means (e.g., memory cards). Further, the amount of SSM made available may be dynamic in that the amount of SSM made available for use as host memory may be dynamically increased and decreased, as described in more detail elsewhere herein. In some embodiments, a same portion of the SSM may be made available for use as host memory of multiple host systems, such that the host systems may share the SSM portion, for example, as part of a distributed application. In such embodiments, write operations to such shared portions may be performed as atomic operations to ensure memory coherency between the multiple host systems.

In some embodiments of the invention, a host system may be directly connected to an internal switching fabric ("internal fabric") of the data storage system without an intervening component of the storage system (e.g., a director) controlling access of the host system to the internal fabric or to the memory and physical devices connected to the internal fabric. For example, the host system may include a storage system interface (SSI) physically connected to a remainder of the host system by one or more interconnects or busses (e.g., in accordance with PCIe technology), where the SSI may be physically connected directly to the internal fabric of the data storage system. For example, the SSI may reside on an integrated circuit card or other physical component that is plugged into a port of the host system. The direct connection to the internal switching fabric may enable the host system to bypass networks external to the storage system (including switch fabrics and physical links), and bypass internal components of the storage system, including directors and the like, when accessing SSM or physical storage devices of the storage system. Furthermore, such bypassing may enable hosts to communicate with storage system memory and physical storage devices without using one or more proprietary or standard protocols (e.g., Fibre Channel (FC), SCSI, iSCSI) required by the bypassed external networks and/or internal components of the storage system, and avoid the processing delays inherent in the bypassed switch fabrics, directors and other components processing communications in accordance with such protocols. Thus, the host system being directly connected to the internal fabric of the storage system may reduce (e.g., substantially) IO (e.g., read and write) response times and access times to other information (e.g., metadata) on the storage system.

In embodiments in which a host system is directly connected to an internal fabric of the data storage system, the host system may use the SSM as host memory by directly communicating with the SSM over the internal fabric, for example, using RDMA, as described in more detail elsewhere herein. The logic for allocating the SSM to host systems (e.g., dynamically) may reside on the storage system and/or on one or more host systems, for example, on an SSI as described in more detail elsewhere herein.

In addition to being persistent memory in some embodiments, the SSM may be further protected using one or more techniques, including mirroring, vaulting and other techniques, as described in more detail elsewhere herein. Further, the storage system may be configured to share data among a plurality of host systems, and may be configured to share data in the SSM with multiple host systems, for example, in accordance with executing a distributed application (e.g., a distributed database) on the multiple host systems. In such embodiments, the storage system may be configured to implement memory coherency between the various host systems and application instances accessing the data, for example, using atomic memory operations. For example, the storage system may be configured to protect data, share data and enforce memory coherency, and the mechanisms and techniques described herein may exploit these storage system capabilities in providing SSM to be used as host memory.

The systems and techniques described herein may be used to expand the memory of a host system to use SSM memory that is protected (e.g., write protected), dynamically sized, and coherently shared between multiple servers.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (IO) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of IO operations in accordance with different tasks and applications executing on the hosts. In the embodiment of FIG. 1, any one of the host computers 14a-n may issue an IO request to the storage system 20a to perform an IO operation. For example, an application executing on one of the host computers 14a-n may perform a read or write operation resulting in one or more IO requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of IO requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all IO communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also are referred to herein as front-end adapters ("FAs") (e.g., directors configured to serve as FAs). Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for IO communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing IO operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform IO operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (TB), Ethernet, GenZ, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

The memory 26 may include persistent memory for which for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof—e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

Storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
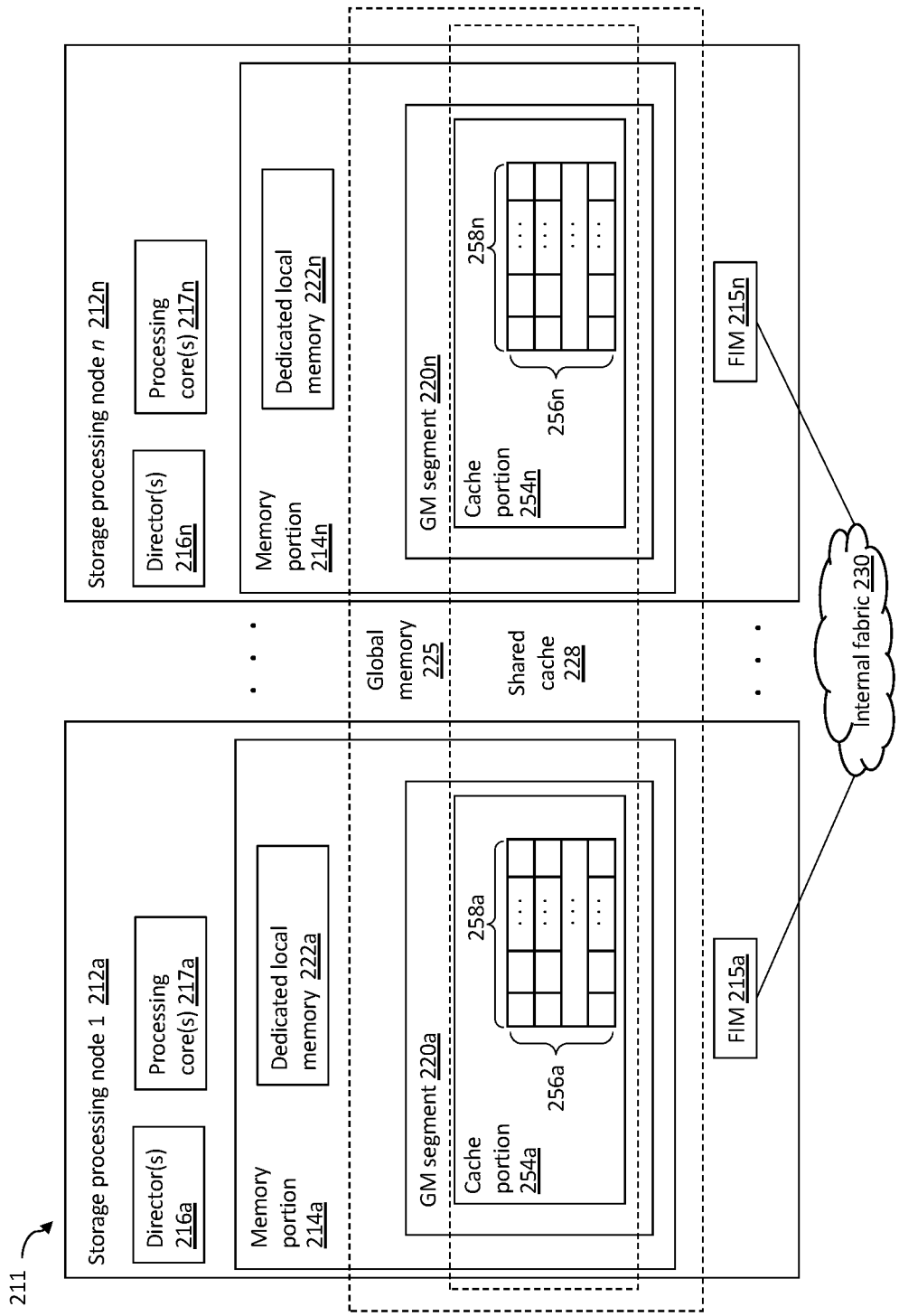
FIG. 2 is a block diagram illustrating an example of a storage system including multiple physically discrete storage processing nodes, according to embodiments of the invention.

Any of storage systems 20a-n, or one or more components thereof, described in relation to FIGS. 1-2 may be implemented using one or more Symmetrix®, VMAX®, VMAX3® or PowerMax™ systems made available from Dell EMC.

Host systems 14a-n may provide data and control (e.g., management and access control) information to storage systems 20a-n over a plurality of IO paths defined between the host systems and storage systems, for example, including host system components, storage system components, and network components (e.g., of network 18), and the storage systems also may provide data to the host systems across the IO paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple, physically discrete storage processing nodes (e.g., circuit boards) 212a-212n, which may be referred to herein as "processing nodes." Storage system 211 may include a plurality of processing nodes 212a-212n and a fabric 230 (e.g., internal fabric 30) over which the processing nodes 212a-n may communicate. Each of the processing nodes 212a-212n may include components thereon as illustrated. The fabric 230 may include, for example, one or more switches and connections between the switch(es) and processing nodes 212a-212n. In at least one embodiment, the fabric 230 may be an IB fabric. In some embodiments, multiple processing 212a-n nodes may be implemented on a single physically discrete component; e.g., two processing nodes 212a-n may be implemented on single engine of PowerMax storage system.

In the following paragraphs, further details are described with reference to processing node 212a but each of the N processing nodes in a system may be similarly configured. For example, processing node 212a may include any of: one or more directors 216a (e.g., directors 37a-n); memory portion 214a; one or more processing cores 217a including compute resources, for example, as part of a CPUs and/or a CPU complex for processing IO operations; and a fabric interface module (FIM) 215a for interfacing the processing node 212a to an internal fabric 230. Each director 216a may be configured to operate, such as by executing code, as any one or more of an FA, BE, RA, and the like. In some embodiments, each of the directors, or a portion thereof, are implemented in software stored in a memory portion 214a (e.g., in a dedicated local memory 222a) that is executed by one or more of the processing cores 217a. Such software implementation of directors may be considered emulations of types of physical directors (i.e., directors implemented (at least primarily) in hardware).

Each FIM 215a-n may include one or more host channel adapters (HCAs) that physically couple, and are configured to enable communication between, its respective processing node 212a-n, and the internal fabric 230. In some embodiments, the internal fabric 230 may include multiple (e.g., 2) switches, and each HCA 215a-n may have multiple (e.g., 2) ports, each one connected directly to one of the switches.

Each of the processing nodes 212a-n may, respectively, also include memory portions 214a-n. The memory portion of each processing node may be characterized as locally accessible with respect to that particular processing node, and more specifically with respect to other components on the same processing node. For example, processing node 212a includes memory portion 214a which is memory that is local to that particular processing node 212a. Data stored in memory portion 214a may be directly accessed by any of the processing cores 217a (e.g., executing instructions on behalf of one of the directors 216a) of the processing node 212a. For example, memory portion 214a may be a fast memory (e.g., DIMM (dual inline memory module) DRAM (dynamic random access memory)) that is locally accessible by a director 216a, where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of processing nodes 212a-n may be further partitioned into different portions or segments for different uses. For example, each of the memory portions 214a-214n may respectively include GM segments 220a-n configured for collective use as segments of a distributed GM, for example, GM 225 (e.g., GM 25b). Thus, data stored in any GM segment 220a-n may be accessed by any director 216a-n on any processing node 212a-n. Additionally, each of the memory portions 214a-n may respectively include dedicated local memories 222a-n. Each of the dedicated local memories 222a-n are respectively configured for use locally by the one or more directors 216a-n, and possibly other components, residing on the same single processing node. In at least one embodiment where there is a single director denoted by 216a (and generally by each of 216a-n), data stored in the dedicated local memory 222a may be accessed by the respective single director 216a located on the same processing node 212a. However, the remaining directors located on other ones of the N processing nodes may not access data stored in the dedicated local memory 222a.

To further illustrate, GM segment 220a may include information such as user data stored in the cache portion 220a, metadata, and the like, that is accessed (e.g., for read and/or write) generally by any director of any of the processing nodes 212a-n. Thus, for example, any director 216a-n of any of the processing nodes 212a-n may communicate over the fabric 230 to access data in GM segment 220a. In a similar manner, any director 216a-n of any of the processing nodes 212a-n may generally communicate over fabric 230 to access any GM segment 220a-n of the distributed GM. Although a particular GM segment, such as 220a, may be locally accessible to directors on one particular processing node, such as 212a, any director of any of the processing nodes 212a-n may generally access the GM segment 220a. Additionally, the director 216a also may use the fabric 230 for data transfers to and/or from GM segment 220a even though 220a is locally accessible to director 216a (without having to use the fabric 230).

Also, to further illustrate, dedicated local memory 222a may be a segment of the memory portion 214a on processing node 212a configured for local use solely by components on the single/same processing node 212a. For example, dedicated local memory 222a may include data described in following paragraphs which is used and accessed only by directors 216a included on the same processing node 212a as the dedicated local memory 222a. In at least one embodiment in accordance with techniques herein and as described elsewhere herein, each of the dedicated local memories 222a-n may include a local page table or page directory used, respectively, by only director(s) 216a-n local to each of the processing nodes 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the cache portion 254a, various metadata and/or structures, and other information, as described in more detail elsewhere herein. Consistent with discussion herein, the cache portion 254a, having cache slots allocated from GM segments 220a-n, may be used to store IO data (e.g., for servicing read and write operations).

Each cache portion 254a-n may be a portion of a shared cache 228 (e.g., cache 28) distributed across the processing nodes 212a-n, where the shared cache 228 may be considered a part of the GM 225. The cache portion 254a-n may include a plurality of cache slots 256a-n, each cache slot including one or more (e.g., 16) sections 258a-n. Each cache slot 256a-n may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process IO on storage system 20a, including data structures to manage the mapping of LSUs and locations thereon to physical storage devices and locations thereon. Such data structures may be stored in any of memory 26, including GM 25b and memory 25a, GM segment 220a-n and/or dedicated local memories 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3A:
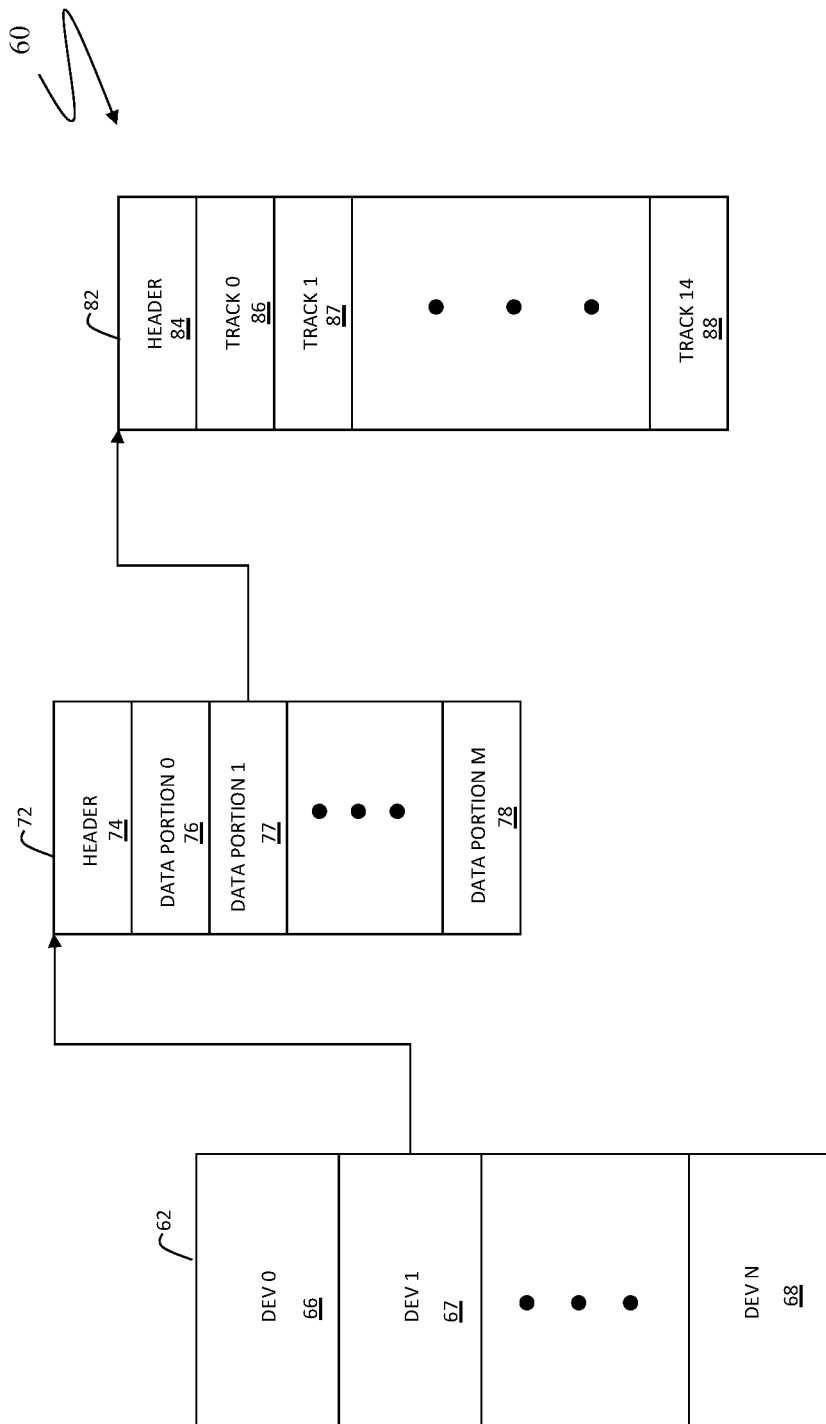
FIG. 3A is a block diagram illustrating an example of tables defining relationships between logical storage units and physical storage devices on a data storage system, according to embodiments of the invention.

FIG. 3A is a block diagram illustrating an example of tables 60 defining relationships between LSUs and physical storage devices on a data storage system, according to embodiments of the invention. A first table 62 corresponds to the LSUs (e.g., logical deices) used by a storage system (e.g., storage system 20a) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20a (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 300, described in more detail elsewhere herein. Thus, the LSU track table 82 may be used to map logical addresses of an LSU corresponding to the tables 62, 72, 82 to physical addresses within physical storage devices of a storage system and/or to cache slots within a cache.

In some embodiments, each entry 86-88 may specify a version of the data stored on the track, as described in more detail elsewhere herein.

FIG. 3B is a diagram illustrating an example of a table 72' used for a thin logical device (i.e., a thin LSU), which may include null pointers as well as entries similar to entries for the LSU table 72, discussed above, that point to a plurality of LSU track tables 82a-82e. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the data portion maintains the null pointer that was written at initialization.

FIG. 3C is a block diagram illustrating an example of a data structure 300 for mapping LSU tracks (e.g., thin device tracks) to cache slots of a cache. Data structure 300 may be referred to herein as a "cache slot table." Cache slot table 300 may include a plurality of entries (i.e., rows) 302, each row representing an LSU track (e.g., any of LSU tracks 86-88 in track table 82) identified by an LSU ID in column 304 and an LSU track ID (e.g., number) identified in column 306. For each entry of cache slot table 300, column 512 may specify a cache location in a cache corresponding to the logical storage device track specified by columns 304 and 306. A combination of an LSU identifier and LSU track identifier may be used to determine from columns 304 and 306 whether the data of the identified LSU track currently resides in any cache slot identified in column 312. Through use of information from any of tables 62, 72, 72' and 82 described in more detail elsewhere herein, the one or more LSU tracks of an LSU specified in an IO operation can be mapped to one or more cache slots. Further, using the same data structures, the one or more physical address ranges corresponding to the one or more LSU tracks of the LSU may be mapped to one or more cache slots.

Storage systems (e.g., the storage system 20a) also may maintain data structures (e.g., masking tables) that define IO connectivity in terms of LSUs, storage ports and host ports; i.e., which ports of a host system ("host ports"; e.g., SCSI initiators) are permitted to perform IO communications with which LSUs (e.g., identified with, and sometimes referred to as, a Logical Unit Numbers (LUNs)) over which ports of a storage system ("storage ports" e.g., SCSI targets). Defining (including initially defining and later modifying) which host ports are permitted to perform IO communications with which LSUs over which storage ports, for example, using a masking table or other data structure, may be referred to as configuring or defining IO connectivity between a host port, storage port and LSU, or more simply as "masking."

FIG. 3D is a block diagram illustrating an example of a data structure 350 defining port connectivity permissions between a storage system and one or more host systems, according to embodiments of the invention. Other embodiments of a data structure defining port connectivity permissions between a storage system and one or more host systems, for example, variations of data structure 350, are possible and are intended to fall within the scope of the invention. In some embodiments, data structure 350 may be a masking table. Data structure 350 may include a plurality of entries 360, each entry representing an LSU (e.g., logical device) identified in column 352 and specifying a host port (e.g., by World Wide Name (WWN)) in column 354 with which the identified LSU is enabled to communicate IO over the storage port identified in column 356. Other information, for example, the host and/or the HBA associated with the host port and/or the HA associated with the storage port may be specified in column 358. A data structure other than a table, for example, a linked list and/or object-oriented data structure, may be used to record the same information.

The tables 62, 72, 72', 82, 300 and 350 of FIGS. 3A-3D may be stored in the GM 26 of the storage system 20a during operation thereof and may otherwise be stored in non-volatile memory (i.e., with the corresponding physical storage device). In addition, tables corresponding to LSUs accessed by a particular host may be stored in local memory of the corresponding one of the FAs 21a-n. In addition, RA 40 and/or the BEs 23a-n may also use and locally store portions of the tables 62, 72, 72', 82, 300 and 350. Other data structures may be stored in any of GM 25b, memory 25a, GM segment 220a-n and/or dedicated local memories 22a-n.

FIG. 4 is a block diagram illustrating an example of a system 100 including a host system 102 communicatively coupled to a data storage system 120 via multiple IO paths, according to embodiments of the invention. Other embodiments of system including a host system communicatively coupled to a data storage system via multiple IO paths, for example, variations of system 100, are possible and are intended to fall within the scope of the invention. The system 100 may be implemented using one or more components of the system 10, for example, one or more storage systems 20a-n and/or one or more hosts 14a-14n, or variation thereof.

The system 100 may include a host system 102, switch 140 and data storage system 120. The host system 102 and data storage system 120 may communicate over one or more IO paths through the switch 140. Elements 110a-110c denote connections between the host system 102 and switch 140. Element 112a-112c denote connections between the data storage system 120 and the switch 140. Element 130 may represent a physical storage device of the data storage system 120, such as, for example, a rotating disk drive or a solid state storage device (e.g., flash, storage class memory (SCM)), where the physical storage physical storage device 130 may be configured to include three LSUs—LUN5, LUN6 and LUN10. It should be noted that in the illustrative embodiment of FIG. 4, the system 100 includes only a single host system 102, single physical storage device 130 with 3 LSUs, a single data storage system 120, and a single switch for purposes of simplicity to illustrate the techniques herein. For example, each of the LSUs may be configured to have storage provisioned from multiple different physical storage devices rather than a single physical storage device, and multiple host systems having multiple applications executing thereon may communicate with the data storage system.

It should be appreciated that the descriptions provided in the following paragraphs may refer to particular examples using the switch 140 having a switching fabric for simplicity of illustration. Element 140 may be a single switch having a switching fabric, or a multi-switch having a multi-switch fabric and the like. Thus, element 140 may more generally denote a network having its own connectivity fabric or network fabric where the network may include one or more components providing the connectivity between the host system 102 and data storage system 120.

The host system 102 may be implemented as a server, and may include an application 104, a multi-path (MP) driver 106 and other components 108 such as, for example, one or more other device drivers and other code. An IO request (specifying an IO operation) from the application 104 may be communicated to the data storage system 120 using the MP driver 106 and one or more other components 108. The application 104 may be a database or other application which issues data operations, such as IO operations, to the data storage system 120. Each of the IO operations may be directed to a target device, such as one of the LSUs of physical storage device 130, configured to be accessible to the host system 102 over multiple IO paths. As such, each of the IO operations may be forwarded from the application 104 to the data storage system 120 over one of the possible multiple IO paths.

The MP driver 106 may include functionality to perform any one or more different types of processing such as related to encryption, multi-pathing, mirroring, migration, and the like. For example, the MP driver 106 may include multi-pathing functionality for management and use of multiple IO paths. For example, the MP driver 106 may perform IO path selection to select one of the possible multiple IO paths based on one or more criteria such as load balancing to distribute IO requests for the target device across available active IO paths. Load balancing may be performed to provide for better resource utilization and increased performance of the host system, data storage system, and network or other connection infrastructure. The MP driver 106 may be included in a commercially available product such as, for example, Dell EMC PowerPath® software made available by Dell EMC. Other components 108 of the host system 102 may include one or more other layers of software used in connection with communicating the IO operation from the host system to the data storage system 120 such as, for example, Fibre Channel (FC) or SCSI drivers, a logical volume manager (LVM), or the like. The other components 108 may include software or other components used when sending an IO operation from the application 104 to the data storage system 120, where such components may include those invoked in a call stack above and/or below the MP driver 106. For example, application 104 may issue an IO operation which is communicated via a call stack including an LVM, the MP driver 106, and an FC or SCSI driver, e.g., as described elsewhere herein in more detail.

The data storage system 120 may include one or more physical storage devices, such as physical storage device 130, where each such physical storage device may be configured to store data of one or more LSUs. Each of the LSUs having data stored on the physical storage device 130 may be configured to be accessible to the host system 102 through one or more IO paths. For example, all LSUs of physical storage device 130 may be accessible using ports of the three FEs 122a-122c, also denoted respectively as host adapters HA1, HA2 and HA3. The multiple IO paths allow the application IOs to be routed over multiple IO paths and, more generally, allow the LSUs of physical storage device 130 to be accessed over multiple IO paths. In the event that there is a component failure in one of the multiple IO paths, IO requests from applications can be routed over other alternate IO paths unaffected by the component failure. The MP driver 106 may be configured to perform load balancing in connection with IO path selection, as well as other processing. The MP driver 106 may be aware of, and may monitor, all IO paths between the host system and the LSUs of the physical storage device 130 in order to determine which of the multiple IO paths are active or available at a point in time, which of the multiple IO paths are unavailable for communications, and to use such information to select an IO path for host system-data storage system communications.

In the example of the system 100, each of the LSUs of the physical storage device 130 may be configured to be accessible through three IO paths. Each IO path may be represented by two path endpoints having a first endpoint on the host system 102 and a second endpoint on the data storage system 120. The first endpoint may correspond to a port of a host system component, such as a host bus adapter (HBA) of the host system 102, and the second endpoint may correspond to a port of a data storage system component, such as a port of an HA of the data storage system 120. In the example of the system 100, elements A1, A2 and A3 each denote a port of a host system 102 (e.g., a port of an HBA), and elements B1, B2 and B3 each denote a port of an HA of the data storage system 120. Each of the LSUs of the physical storage device 130 may be accessible over three IO paths—a first IO path represented by A1-B1, a second IO path represented by A2-B2 and a third IO path represented by A3-B3.

FIG. 5 is a block diagram illustrating an example of a plurality of logical layers 150 of a combination of a host system (e.g., the host system 102 of FIG. 3) and a data storage system (e.g., the data storage system 120) for processing an IO request, according to embodiments of the invention. Other embodiments of a plurality of logical layers of a combination of a host system and a data storage system for processing an IO request, for example, variations of logical layers 150, are possible and are intended to fall within the scope of the invention. FIG. 5 provides further detail regarding various software layers that may be used in connection with the MP driver 106 of FIG. 4. The various software layers of 150 may generally form layers included in the runtime IO stack, such as when an IO request is issued by an application on a host system to a data storage system. The system includes an application layer 121 which includes application programs executing on the host system computer 102. The application layer 121 may refer to storage locations using an associated label or identifier such as a file name or file identifier. Below the application layer 121 is the file system layer 123 and the LVM layer 125a that maps the label or identifier specified by the application layer 121 to an LSU which the host system may perceive as corresponding to a physical storage device address (e.g., the address of one of the disk drives) within the storage system. Below the LVM layer 125a may be the MP (multi-path) driver 106 which handles processing of the IO received from layer 125a. The MP driver 106 may include a base driver and one or more driver extension modules. The MP driver 106 may be implemented using a commercially available product such as Dell EMC PowerPath software.

Functionality for performing multi-pathing operations, such as may be performed by Dell EMC PowerPath software, may be included in one of the driver extension modules such as a multi-path extension module. As described above, the MP driver may perform processing in connection with multiple IO path management and selecting one of a plurality of possible IO paths for use in connection with processing IO operations and communicating with the data storage system, such as data storage system 120 of FIG. 4. More generally, one or more layers between the application layer 121 and the MP driver 106, for example, the file system 123, may provide for mapping an LSU (such as used in connection with block-based storage), presented by the data storage system to the host system, to another logical data storage entity, such as a file, that may be used by the application layer 121. Below the MP driver 106 may be the SCSI driver 125b and a hardware (HW) driver 125c. The SCSI driver 125b may handle processing of a received IO request from the MP driver 106 such as related to forming a request in accordance with one or more SCSI standards. The driver 125c may be a hardware driver that facilitates communication with hardware on the host system. The driver 125c may be, for example, a driver for an HBA of the host system which sends commands or requests to the data storage system and also receives responses and other communications from the data storage system. It should be appreciated that, in some embodiments, the ordering of the MP driver 106 and SCSI driver 125b may be reversed. That is, in some cases, the MP driver 106 sits below the SCSI driver 126b.

In some embodiments, layers 121-125c are implemented on a host (e.g., the host system 102) coupled to a data storage system (e.g., the data storage system 120) that is an intelligent data storage system having its own mapping layer 127 such that the LSU known or exposed to the host system may not directly correspond to a physical storage device such as a disk drive. In such embodiments, the LSU specified by the host system in the IO operation may be further mapped by the data storage system using its mapping layer 127. For example, an LSU specified by the host system may be mapped by the data storage system to one or more physical drives, and multiple LSUs may be located on a same physical storage device, multiple physical drives, and the like.

The MP driver 106, as well as other components illustrated in FIG. 5, may execute in a kernel mode or another privileged execution mode. In some embodiments using a Unix-based OS, the MP driver 106 may be executed in kernel mode, whereas an application such as represented by application layer 121 may typically execute in user mode, or more generally, a non-privileged execution mode. It should be appreciated that embodiments of the invention may be implemented using any of a variety of different suitable OSs including a Unix-based OS, a Linux-based system, any one of the Microsoft Windows® OSs, or other OSs. Additionally, the host system may provide a virtualized environment and may execute, for example, VMware ESX® or VMware ESXi™ software providing bare-metal embedded hypervisors.

In operation, an application executing at application layer 121 may issue one or more IO requests specifying IO operations (e.g., read and write operations) to logical volumes (implemented by the LVM 125a) or files (implemented using the file system 123), whereby such IO requests may be mapped to IO communications (specifying the IO operation) directed to LSUs of the data storage system. Such IO operations from the application layer 121 may be directed to the MP driver 106 after passing through any intervening layers such as, for example, the layers 123 and 125a. Communications between an initiator port of the host system and a target port of a data storage system (e.g., target port of an HA) may include those related to IO operations and other non-IO commands such as related to host system control operations. IO operations may include, for example, read and write operations with respect to data stored on an LSU.

In connection with the SCSI standard, an IO path may be defined between an initiator port of the host system and a target port of the data storage system. An IO request may be sent from the host system (e.g., from a component thereof such as an HBA), which may be referred to as an initiator, originator or source with respect to the foregoing IO path. The host system, as the initiator, sends IO requests along the IO path to a data storage system (e.g., a particular component thereof such as an HA having a port with a network address), which may be referred to as a target, destination, receiver, or responder. Each physical connection of an IO path may be between a first endpoint which is a port of the host system (e.g., such as an HBA having ports such as denoted as A1-A3 of FIG. 4) and a second endpoint which is a port of an HA (e.g., such as B1-B3 of FIG. 4) in the data storage system. Through each such IO path, one or more LSUs may be visible or exposed to the host system initiator through the target port of the data storage system.

In some embodiments of the invention, a host system is directly connected to an internal fabric of a storage system; i.e., the host is connected to the internal fabric without an intervening director (e.g., FA) or other component of the storage system controlling the host system's access to the internal fabric. For example, rather than a host system (e.g., host 14a) being physically coupled to a network (e.g., network 18), which is coupled to an FA (e.g., host adapter 21a), which is coupled to an internal fabric (e.g., internal fabric 30) of a storage system (e.g., storage system 20a), where the FA controls the host system's access to other components (e.g., GM 25b, other directors 37a-n) of the storage system over the internal fabric as illustrated in FIG. 1, the host system may be directly connected to the internal fabric, and communicate with other components of the storage system over the internal fabric independently of any FA or external network. In some embodiments, the host system may communicate with physical storage devices and/or GM over an IO path that does not include any directors (e.g., FAs or BEs), for example, over the internal fabric to which the host system is directly attached. In embodiments in which at least a portion of the GM is considered part of a director, the host system may be configured to communicate with such GM directly; i.e., over the internal fabric and without use of director compute resources (e.g., a CPU core and/or CPU complex).

In some embodiments, the GM may include persistent memory for which data stored thereon (including state information) persists (i.e., remains available) after the process or program that created the data terminates, perhaps even after the storage system fails (for at least some period of time). In some embodiments, the internal fabric exhibits low latency (e.g., when IB is employed). In such embodiments, by enabling a host system to directly access GM of the storage system, which may include persistent memory, host systems may be configured to expand their memory capacity, including persistent memory capacity by using the memory of the storage system. Thus, a system administrator could expand the memory capacity, including persistent memory capacity of the hosts of a storage network without having to purchase, deploy and configure new host systems. Rather, the system administrator may configure existing host systems to utilize the GM of the storage system, and/or purchase, install and configure one or more storage system interfaces (SSIs; described elsewhere herein in more detail) on existing host systems, which may result in significant savings in time and cost. Further, because of the security advantages provided by the SSI described in more detail elsewhere herein, use of the GM may prove more secure than memory, including persistent memory, added to host systems to expand memory capacity.

In some embodiments, an SSI located externally to the storage system may be provided that serves as an interface between the host system and storage system. The SSI may be part of the host system, and in some embodiments may be a separate and discrete component from the remainder of the host system, physically connected to the remainder of the host system by one or more buses that connect peripheral devices to the remainder of the host system. The SSI may be physically connected directly to the internal fabric. In some embodiments, the SSI may be implemented on a card or chipset physically connected to the remainder of a host system by a PCIe interconnect.

A potential benefit of implementing an SSI as a physically separate and discrete component from the remainder of a host system is that the SSI's resources may be configured such that its resources are not available for any functions, tasks, processing or the like on the host system other than for authorized IO processing. Thus, IO performance may be improved and more deterministic, as SSI resources may not be depleted for non-IO-related tasks on the host system. Further, as a physically separate and discrete component from the remainder of the host system, the SSI may not be subject to the same faults as the remainder of the system, i.e., it may be in a different fault zone from the remainder of the host system.

The SSI may provide functionality traditionally provided on storage systems, enabling at least some IO processing to be offloaded from storage systems to SSIs, for example, on host systems. Metadata about the data stored on the storage system may be stored on the SSI, including any metadata described herein. The SSI may be configured to determine whether an IO operation is a read or write operation, and process the IO operation accordingly. If the IO operation is a read operation, the SSI may be configured to determine from metadata whether the data to be read is in cache on the storage system. If the data is in cache, the SSI may read the data directly from cache over the internal fabric without use of CPU resources of a director, and, in some embodiments, without use of a director at all. If the data is not in cache, the SSI may determine, from the metadata, the physical storage device and physical location (e.g., address range) therein of the data to be read. The data then may be read from the physical storage device over the internal fabric without use of a director. Data may be read from a cache or physical storage device to the SSI using RDMA communications that do not involve use of any CPU resources on the storage system, SSI or the host system (e.g., other parts thereof), thereby preserving CPU resources on the storage network.

The IO processing capabilities of an SSI may be used to offload IO processing from a storage system, thereby reducing consumption of IO compute resources on the storage system itself. The overall storage compute capacity of a storage network may be increased without having to upgrade or add a storage system.

In some embodiments, an SSI may implement one or more technology specifications and/or protocols, including but not limited to, NVMe, NVMeoF and IB. For example, SSI may be configured to exchange IO communications with the remainder of the host system in accordance with NVMe. In embodiments in which an SSI is configured to communicate in accordance with NVMe, as opposed to in accordance with a native platform (including an OS or virtualization platform) of the host system, significant development and quality assurance costs may be realized, as developing or upgrading an SSI for each new or updated native platform may be avoided. Rather, the native platform may conform to NVMe, an industry standard, and support an OS-native inbox NVMe driver.

In some embodiments, secure access to data on a storage system via direct connection to an internal fabric may be provided. An SSI may validate each IO communication originating on the host system before allowing a corresponding IO communication to be transmitted on the internal fabric. The validation may include applying predefined rules and/or ensuring that the IO communication conforms to one or more technologies, e.g., NVMe. Additional security measures may include requiring validation of any SSI software or firmware before loading it onto the SSI, for example, using digital signatures, digital certificates and/or other cryptographic schemes, to ensure unauthorized code is not loaded onto the SSI that could enable unauthorized IO activity on a storage system. Further, in some embodiments, the SSI may be configured to encrypt IO communications originating on a host system and to decrypt IO communications received from the storage system, for example, in embodiments in which data is encrypted in flight between the host system to physical storage devices, and data may be encrypted at rest in memory of the storage system and/or on physical storage devices.

In addition, data integrity (e.g., checksums) in accordance with one or more technologies (e.g., T10DIF) may be employed by the SSI on IO communications exchanged between host systems and data storage systems, by which end-to-end data integrity between a host system and physical storage devices may be implemented, as described in more detail herein.

In some embodiments, in addition to an SSI communicatively coupled between a host operating system and an internal fabric of a storage system, a storage network may include an interface communicatively coupled between an internal fabric and a DAE that encloses a plurality of physical storage devices; i.e., a fabric-DAE interface ("FDI"). The FDI may be configured to employ any of a plurality of technologies, including NVMe, NVMeoF and IB, as described in more detail herein. In such embodiments, IO communications configured in accordance with NVMe may be implemented end-to-end from a host system to physical storage device, as described in more detail herein.

As described in more detail herein, through an SSI, a host system may exchange IO communications, including control information (e.g., commands) and data, with GM including cache along an IO path including internal fabric without use of compute resources of any of directors. Further, through an SSI, a host system may exchange IO communications, including control information (e.g., commands) and data, with physical storage devices along an IO path including internal fabric and not including use of directors. Thus, an IO path in a known storage network, which may include an HBA, an external network, an FA, an internal fabric, a BE, a PCI switch and a physical storage device, may be replaced with an IO path in accordance with embodiments of the invention, which includes an SSI, an internal fabric, an FDI and a physical storage device. These new IO paths, eliminating use of external networks and director compute resources (or directors altogether) may produce reduced response times for certain IO operations, as described in more detail elsewhere herein.

By removing an external network from the IO path between a host system and a storage system, and routing IO requests (e.g., all IO requests on a storage network) through one or more SSIs, the possible sources of malicious actions or human error can be reduced; i.e., the attack surface of a storage system can be reduced. Further, by implementing validation logic as described in more detail herein, in particular as close as possible (logically) to where an SSI interfaces with a remainder of a host system (e.g., as close as possible to physical connections to peripheral device interconnects), for example, within an NVMe controller, the storage system may be made more secure than known storage networks having IO paths including external networks. To further reduce access to an SSI, an NVMe driver may be configured as the only interface of an SSI made visible and accessible to applications on a host system. Any other interfaces to an SSI, for example, required for administration, may be made accessible only through certain privileged accounts, which may be protected using security credentials (e.g., encryption keys).

It should be appreciated that, although embodiments of the invention described herein are described in connection with use of NVMe, NVMeoF and IB technologies, the invention is not so limited. Other technologies for exchanging IO communications, for example, on an internal fabric of a storage system, may be used.

Figure 6:
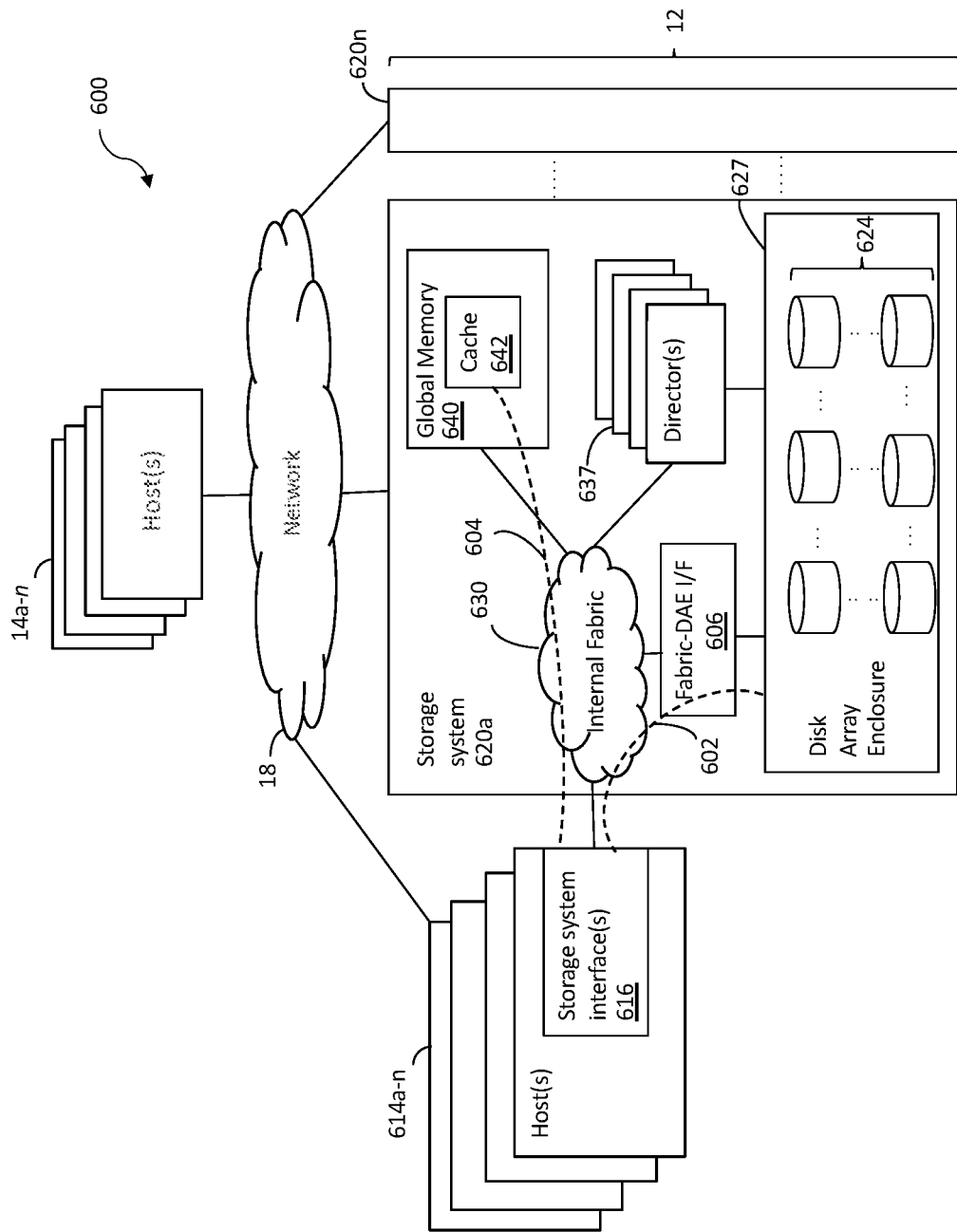
FIG. 6 is a block diagram illustrating an example of a data storage network, including one or more host systems directly connected to internal fabric of a storage system, according to embodiments of the invention.

FIG. 6 is a block diagram illustrating an example of a storage network 600 including one or more host systems 614a-n directly connected to an internal fabric 630 of a storage system 620a, according to embodiments of the invention. Other embodiments of a storage network including one or more host systems directly connected to an internal fabric of a storage system, for example, variations of the storage network 600, are possible and are intended to fall within the scope of the invention.

Storage network 600 may include any of: one or more host systems 14a-n (described in more detail elsewhere herein); network 18 (described in more detail elsewhere herein); one or more host systems 614a-n; one or more storage systems 620a-n; and other components. Storage system 620a may include any of: GM 640 (e.g., any of 25b, 220a-n and/or 220); one or more directors 637 (e.g., 37a-n); a plurality of physical storage devices 624 (e.g., 24), which may be enclosed in a disk array enclosure 627 (e.g., 27); internal fabric 630 (e.g., internal fabric 30); FDI 606, other components; or any suitable combination of the foregoing. Internal fabric 630 may include one or more switches and may be configured in accordance with one or more technologies, for example, IB. In some embodiments, at least a portion of GM 640, including at least a portion of cache 642, may reside on one or more physically discrete processing nodes (e.g., circuit boards) on which one of the directors 637 also resides, for example, in a manner similar to (or the same as) storage processing nodes 212a-n described in relation to FIG. 2. FDI 606 may be configured to manage the exchange of IO communications between host system 614a-n directly connected to internal fabric 630 and physical storage devices 624 (e.g., within DAE 627), as described in more detail elsewhere herein.

Each of host systems 614a-n may include SSI 616 connected directly to internal fabric 630 and configured to communicate with GM 640 and physical storage devices 624 (e.g., via FDI 606) over the internal fabric 630 independently of any of the directors 637 or any external network, for example, network 18. In embodiments in which one or more directors 637 may be included on one or more same processing nodes as at least a portion of GM 640, including at least a portion of cache 642 in some embodiments, SSI 616 may be configured to communicate with such GM 640, including cache 642, directly without use of any of the directors 637 or compute resources (e.g., processing cores of a CPU and/or CPU complex). For example, SSI 616 may be configured to use RDMA as described in more detail herein. Thus, embodiments of the invention in which a host system, or more particularly an SSI, communicates directly with a GM or cache of a storage system include: the host system communicating with a portion of GM or cache not included in any processing node (i.e., where GM is not included on a processing node, but is a physically separate component) independently of any director; and/or the host system communicating with a portion of GM or cache included in on a processing node that also includes one or more directors independently of any compute resources or any of the directors. In both cases, communicating directly with a GM or cache of a storage system does not involve use of any compute resources of the director.

As illustrated in FIG. 6, each of host systems 614a-n may be connected to any of storage system 620a-n through network 18, for example, through an HBA on the host. While not illustrated in FIG. 6, one or more of SSIs 616 may be connected to one or more other storage systems of storage systems 620a-n. It should be appreciated that any of hosts 614a-n may have both: one or more HBAs for communicating with storage systems 620a-n over network 18 (or other networks); and one or more SSIs 616 connected directly to an internal fabric of one or more storage systems 620a-n and configured to communicate with GM and physical storage devices over the internal fabric independently of any directors or external network.

One or more of the directors 637 may serve as BEs (e.g., BEs 23a-n) and/or FAs (e.g., host adapter 21a-n), and enable IO communications between the storage system 620a and hosts 14a-n and/or 614a-n over network 18, for example, as described in relation to FIG. 1. Thus, a storage system 620a may concurrently provide host access to physical storage devices 624 through: direct connections to internal fabric 630; and connections via network 18 and one or more directors 637.

Figure 7:
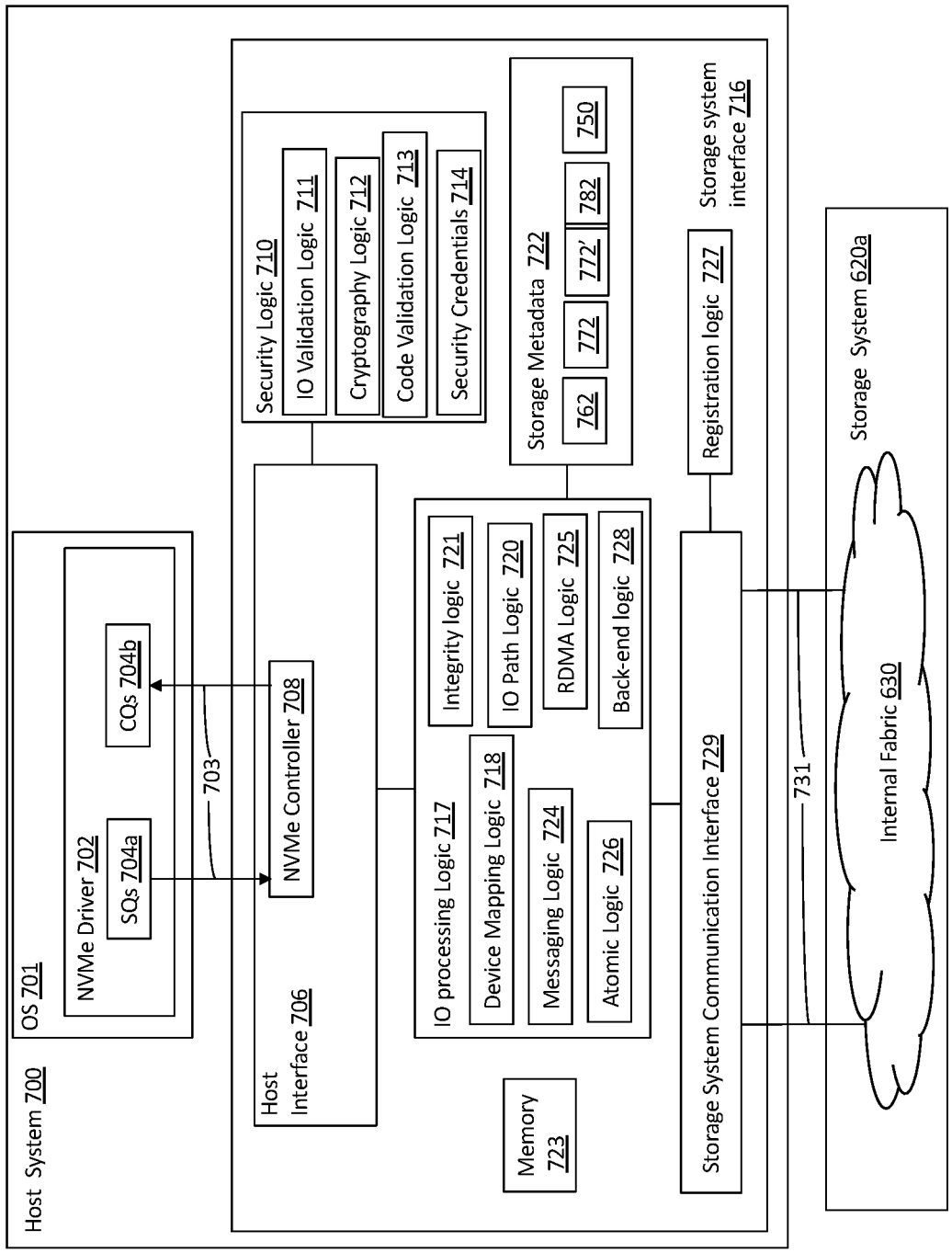
FIG. 7 is a block diagram illustrating an example of a storage system interface of a host system directly connected to internal fabric of a storage system, according to embodiments of the invention.

SSI 616 may be implemented as SSI 716 described in relation to FIG. 7. FIG. 7 is a block diagram illustrating an example of an SSI 716 of a host system 700 directly connected to an internal fabric 630 of a storage system, according to embodiments of the invention. Other embodiments of an SSI of a host system directly connected to an internal fabric of a storage system, for example, variations of SSI 716, are possible and are intended to fall within the scope of the invention.

Host system 700 (e.g., one of host systems 614a-n) may include any of: operating system (OS) 701; an SSI 716 (e.g., SSI 616); one or more peripheral device interconnects 703; other components; and any suitable combination of the foregoing. Host OS 701 may be configured to execute applications running on the host system, which may result in IO operations for data stored on any of storage systems 620a-n, requiring IO communications to be exchanged between the host system and the one or more storage systems 620a-n. Host OS 701 may be any suitable operating system for processing IO operations, for example, a version of Linux, or a hypervisor or kernel of a virtualization platform, for example, a version of VMware ESXi™ software available from VMware, Inc. of Palo Alto, Calif. Other operating systems and virtualization platforms that support an NVMe driver may be used.

In some embodiments, SSI 716 may be physically separate and discrete from the remainder of host system 700, the remainder including the OS 701 of the host system and the hardware and firmware on which the OS 701 executes, and SSI 716 may be pluggable into host system 700, which may be physically configured to receive SSI 716. In such embodiments, the SSI 716 may be considered a first physical part of the host system, for example, a peripheral component or device of the host system, and the remainder of the host system may be considered a second physical part of the host system. For example, SSI 716 may be configured to physically connect to the other part of the host system 700 by the one or more peripheral device interconnects 703, which may be configured in accordance with one or more technologies (e.g., PCIe, GenZ, another interconnect technology, or any suitable combination of the foregoing). An interconnect configured to connect to, and enable communications with, a peripheral component or device may be referred to herein as a "peripheral device interconnect," and a peripheral device interconnect configured in accordance with PCIe referred to herein as a "PCIe interconnect." SSI 716 may be implemented on a card or chipset, for example, in the form of a network interface controller (NIC), which may be configured with additional logic as described herein such that the resulting device may be considered a smart NIC ("SmartNIC"). As is described in more detail herein, SSI 716 may include an operating system for executing one or more IO-related functions. Thus, in some embodiments, a first one or more operating systems (e.g., host OS 701) may be executing applications (e.g., on first part of the host 700) that result in IO operations, while SSI 716 includes one or more second operating systems for performing functions and tasks on SSI 716 in relation to processing such IO operations, such functions and tasks described in more detail elsewhere herein.

In some embodiments, SSI 716 may be configured to communicate according to a PCIe specification over one or more peripheral device interconnects 703, and SSI 716 may be configured to communicate according to an NVMe specification such that the SSI 716 presents itself as one or more NVMe devices (e.g., drives) to the host system 700. For example, the host interface 706 may include an NVMe controller 708 configured to exchange IO communication according to NVMe with NVMe queues within an NVMe driver 702 of OS 701. That is, the OS 701 of the host system 700 may include an NVMe driver 702 configured to exchange IO communications with the NVMe controller 708 in accordance with NVMe. To this end, the NVMe driver 702 may include at least two IO queues, including one or more submission queues (SQs) 704a for submitting commands via a peripheral device interconnect 703 (configured as a PCIe interconnect) to NVMe controller 708, and may have one or more completion queues (CQs) 704b for receiving completed commands from NVMe controller 708 via one or more interconnects 703. Each SQ may have a corresponding CQ, and, in some embodiments, multiple SQs may correspond to the same CQ. In some embodiments, there may be up to 64K IO queues in accordance with a version of the NVMe specification. The NVMe driver 702 also may include an admin SQ and CQ pair for control management in accordance with a version of the NVMe specification, and NVMe driver 702 and NVMe controller 708 may be configured to exchange control management communications with each other using admin SQs and CQs in accordance with a version of the NVMe specification.

SSI 716 may include any of: host interface 706; security logic 710; IO processing logic 717; storage metadata (MD) 722; storage system communication interface (SSCI) 729; registration logic 727; memory 723; other components; or any suitable combination of the foregoing.

Registration logic 727 may be configured to register host system 700 and/or SSI 716 with storage system 620a when SSI 716 is connected to internal fabric 630, to enable future communication between the storage system 620a and internal fabric 630.

Security logic 710 may include any of: IO validation logic 711; cryptographic logic 712; code validation logic 713; security credentials 714; other components; or any suitable combination of the foregoing. IO validation logic 711 may prevent any undesired (e.g., invalid) communications from being further processed by SSI 716 or storage system 620a. Security logic 710, and more specifically IO validation logic 711, may be a first component of SSI 716 to act on a communication received on one of the peripheral device interconnects 703, to ensure that any undesired communications do not proceed any further within SSI 716 and storage system 620a. To this end, it should be appreciated that one or more aspects of security logic 710, including IO validation logic 711 and code validation logic 713, or portions thereof, may be implemented as part of host interface 706, for example, as part of NVMe controller 708.

IO validation logic 711 may include logic that verifies that a communication received on one of peripheral device interconnects 703 is indeed an IO communication authorized to be transmitted on SSI 716. For example, IO validation logic 711 may be configured to ensure that a received communication is an IO communication properly configured in accordance with NVMe, and to reject (e.g., discard or drop) any received communications not properly configured. Further, IO validation logic 711 may be configured to allow only a certain subset of IO operations, for example, read or write operations, and reject other IO operations, for example, operations to configure storage and/or other storage management operations. Such stipulations may be captured as one or more user-defined rules that may be defined and stored (e.g., in a rules data structure) within SSI 716. It should be appreciated that rules may be specific to one or more storage-related entities, for example, users, groups of users, applications, storage devices, groups of storage devices, or other property values. Thus IO validation logic 711 may be configured to implement any of a variety of business rules to control access to resources on storage system 620a.

Cryptographic logic 712 may be configured to encrypt data included in IO communications received from host OS 701 and before repackaging the data (in encrypted form) in IO communications transmitted over internal fabric 630 to components of storage system 620a. Cryptographic logic 712 also may be configured to decrypt data from IO communications received from internal fabric 620a before sending the unencrypted data in IO communication to host OS 701. Any of a variety of cryptographic schemes may be used, including use of symmetric and/or asymmetric keys, which may be shared or exchanged between SSI 716 of the host system, one or more storage systems 620a-n, and one or more SSIs of other host systems 614a-n, depending on what entities are entitled access to the data. For example, during a manufacturing and/or configuring of SSIs 716 and/or storage systems 620a-n, one or more encryption keys and/or other secrets (collectively, "security credentials") may be shared, to enable implementation of the given cryptographic scheme, and may be stored as part of security credentials 714.

In embodiments in which data is encrypted on SSI 716 before being transmitted to the storage system 620a, the data may be stored in encrypted form in physical storage devices 624 and/or GM 640. In such embodiments, directors 637 and other components that may be authorized to access the encrypted data also may be configured to implement whatever cryptographic scheme is being employed, which may be desirable for host systems (e.g., host systems 14a-n) that may access storage system 620a by means other than an SSI as described herein. In some known storage systems, physical storage devices may be self-encrypting drives that encrypt data received from BEs, and then decrypt the data when it is retrieved for BEs. This may be considered a form of data-at-rest encryption. In embodiments of the invention in which data is encrypted on SSI 716, and transmitted to physical storage devices 624 in encrypted form to be stored, it may be desirable that physical storage devices 624 do not employ their own encryption, as the data will arrive encrypted. That is, encrypting the already-encrypted data would be redundant, and a waste of processing resources. Further, self-encrypting drives may be more expensive than drives not including this feature. Thus, if there is no need for physical storage devices 624 to encrypt and decrypt data, physical storage device not having self-encryption, but otherwise having the same or similar capabilities, may be acquired at reduced cost.

By encrypting data on a host system, e.g., as part of an SSI 716, data may not only be able to be encrypted while at rest, but also while in transit. That is, in embodiments of the invention, data may be encrypted in transit on an IO path from a host system to a physical storage device (i.e., end-to-end) as well as being encrypted at rest on a physical storage device or in memory (e.g., cache) of a storage system.

As described in more detail elsewhere herein, SSI 716 may be implemented in various combinations of hardware, software and firmware, including microcode. In some embodiments of SSI 716 implemented using software and/or firmware, the software and/or firmware, and updates thereto, may be subject to verification of digital signature before being allowed to be installed on SSI 716. For example, the security credentials 714 may include a public certificate that includes a cryptographic key (e.g., a public key of a PKI pair or the like), which may be embedded within the software and/or firmware initially installed on SSI 716 (e.g., at the manufacturer of SSI 716). The public certificate also may specify a validity period for the public certificate. Each subsequent update of the software and/or firmware may be digitally signed with a digital signature based on an encryption scheme (e.g., PKI) involving the public key.

When a purported software and/or firmware update is received at SSI 716 including a digital signature, code validation logic 713 may use the public key (and the validity period) in the public certificate to validate the digital signature and thereby verify the authenticity of the update, for example, by exchanging communications with a certification service or the like of the SSI 716 manufacturer or a trusted third-party, using known techniques. The security credentials 714, including the public certificate and perhaps other credentials, and credentials used for encrypting and decrypting data, may be embedded within the software and/or firmware on the SSI 716 so that they are not accessible by the host system 700 or any other entity connected to the SSI 716. For example, the security credentials 714 may be stored within a trusted platform module (TPM) or the like within SSI 716. If the code validation logic determines the software or firmware update to be invalid, the update may not be installed on SSI 716. Such verification of the software and/or firmware may prevent an attacker from replacing software and/or firmware on SSI 716 with code that would allow access to resources within storage system 620a.

Storage metadata 722 may include any metadata about data stored on storage system 620a, including but not limited to any of the metadata described herein. For example, storage MD 722 may include any of master device table 762, LSU table 772, thin device table 772', track table 782 and cache slot table 750, corresponding to master device table 62, LSU table 72, thin device table 72', track table 82 and cache slot table 300, respectively. For example, each of tables 762, 772, 772', 782 and 750 may include at least a portion of the metadata stored in 762, 772, 772', 782 and 750, respectively; e.g., metadata corresponding to physical storage devices 624, and logical storage devices associated therewith, being used for applications running on host system 700. Use of such metadata is described in more detail elsewhere herein.

IO processing logic 717 may include one or more components for performing IO operations in conjunction with storage system 620a. In some embodiments, one or more of these components embody IO functionality, including data services, that is implemented on known storage systems. By implementing such IO functionality on SSI 716 instead of on the storage system 620a, less storage system resources may be consumed, and overall IO performance on the storage system may be improved. IO processing logic 717 may include any of: device mapping logic 718; IO path logic 720; integrity logic 721; messaging logic 724; RDMA logic 725; atomic logic 726; back-end logic 728; other components; or any suitable combination of the foregoing.

Device mapping logic 718 may be configured to map logical addresses of logical storage devices to locations (i.e., physical addresses) within physical storage devices using, e.g., any one or more of tables 762, 772, 772' and 782, 750.

Device mapping logic 718 may be configured to determine, from the retrieved metadata, the location(s) within cache 642 and/or within one or more physical storage devices 624 corresponding to the logical location specified in the IO operation. The IO operation (e.g., read or write) then may be performed with respect to the determined cache location and/or one or more physical storage device locations. In some embodiments, the device mapping logic 718, in coordination with one or more other components of IO processing logic 717, SSI 716 and/or host system 700, may perform aspects of IO operations, including exchanging communications with components of storage system 620a over internal fabric 630, as described in U.S. patent application Ser. No. 16/389,383, titled "Host System Directly Connected to Internal Switching Fabric of Storage System," to Wigmore et al., filed Apr. 19, 2019 ("Wigmore"), the entire contents of which are hereby incorporated by reference.

It should be appreciated that, while in some embodiments described herein, the metadata corresponding to a logical location may be used to determine a corresponding one or more locations in cache and/or a physical storage location, the metadata may include a variety of information other than location information, as described in more detail elsewhere herein, and may be used for any of a variety of other purposes, for example, by one or more components of host system 700 and/or storage system 620a.

IO path logic 720 may be configured to determine what IO path within storage system 620a to use to process an IO operation. IO path logic 720 may be configured to determine what path to take for an IO operation based on any of a variety of factors, including but not limited to whether the IO is a read or write; how complicated a state of the storage system is at the time the IO operation is being processed; whether the data specified by the IO operation is in a cache of the storage system; other factors; or a combination of the foregoing. For example, based on one or more of the foregoing factors, IO path logic 720 may determine whether to process an IO request by: sending a communication to a director; directly accessing a cache on the storage system (i.e., without using any compute resources of a director) or accessing a physical storage device without using a director (e.g., via an FDI). IO path logic 720 may be configured to determine what IO path within storage system 620a to use to process an IO operation as described in more detail in Wigmore.

Integrity logic 721 may be configured to implement one or more data integrity techniques for IO operations. Some data storage systems may be configured to implement one or more data integrity techniques to ensure the integrity of data stored on the storage system on behalf of one or more host systems. One such data integrity technique is called DIF (data integrity field), or "T10DIF" in reference to the T10 subcommittee of the International Committee for Information Technology Standards that proposed the technique. Some storage systems, for example, in accordance with one or more technology standards, store data arranged as atomic storage units called "disk sectors" having a length of 512 bytes. T10DIF adds an additional 8 bytes encoding a checksum of the data represented by the remaining 512 byes, resulting in data actually being stored as 520-byte atomic units, including 512 bytes of data and 8 bytes of checksum data in accordance with T10DIF. In embodiments of the invention in which storage system 620a is implementing T10DIF, integrity logic 721 may be configured to implement T10DIF, thereby converting 512-byte units of data in IO communications received from host OS 701 to 520-byte units of data in accordance with T10DIF to be transmitted in IO communications to storage system 620a. In such embodiments, integrity logic 721 also may be configured to convert 520-byte units of data in IO communications received from storage system 620a to 512-byte units of data to be transmitted in IO communications to host OS 701. In such embodiments, data integrity on a storage network (e.g., storage network 600) may be improved by implementing T10DIF on an IO path from a host system to a physical storage device (e.g., end-to-end).

Processing IO operations in accordance with embodiments of the invention may include exchanging RDMA communications, control (e.g., command) communications and atomic communications between host system 700 and storage system 620a. RDMA logic 725, messaging logic 724, and atomic logic 726, respectively, may be configured to implement such communications. Atomic communications involve performing exclusive locking operations on memory locations (e.g., at which one or more data structures described herein reside) from which data is being accessed, to ensure that no other entity (e.g., a director) can write to the memory location with other data. The exclusive locking operation associated with an atomic operation introduces a certain amount of overhead, which may be undesired in situations in which speed is of greater performance.

It may be desirable for host system 700; e.g., SSI 716, to know information (e.g., a state) of one or more physical storage devices 624, for example, whether a physical storage device is off-line or otherwise unavailable, e.g., because of garbage collection. To this end, in some embodiments, back-end logic 728 may monitor the status of one or more physical storage devices 624, for example, by exchanging communications with FDI 606 over internal fabric 630.

The SSCI 729 may include logic for steering and routing IO communications to one or more ports 731 of SSI 716 physically connected to internal fabric 630, and may include logic implementing lower-level processing (e.g., at the transport, data link and physical layer) of IO communications, including RDMA, messaging and atomic communications. In some embodiments of the invention, communications between SSI 716 and components of storage system 620a (e.g., directors 637, GM 640 and FDI 606) over internal fabric 630 may be encapsulated as NVMeoF command capsules in accordance with an NVMeoF specification. For example, SSCI 729 may include logic for encapsulating IO communications, including RDMA, messaging and atomic communications, in accordance with NVMeoF. Thus, in some embodiments, IO communications received from NVMe driver 702, configured in accordance with NVMe, may be converted to NVMeoF command capsule communications for transmission over the internal fabric 630. SSCI 729 also may include logic for de-capsulating NVMeoF command capsules, for example, into NVMe communications to be processed by IO processing logic 717.

The SSCI 729 (and components of the storage system 620a interfacing with the internal fabric 630) may be configured to address communication to other components; e.g., GM 640, FDI 606, directors 637, in accordance with one or more technologies being used to communicate over internal fabric 630. For example, in embodiments in which IB is employed to communicate over internal fabric 630, SSCI 729 may be configured to address communication to other components using IB queue pairs. Aspects of SSCI 729 may be implemented using a network adapter (e.g., card or chip), for example, a ConnectX®-5 or ConnectX®-6 dual-port network adapter available from Mellanox Technologies, Ltd. of Sunnyvale, Calif. ("Mellanox"), for example, as part of a SmartNIC.

The SSI 716 may be implemented as a combination of software, firmware and/or hardware. For example, SSI 716 may include certain hardware and/or firmware, including, for example, any combination of printed circuit board (PCB), FPGA, ASIC, or the like, that are hardwired to perform certain functionality, and may include one or more microprocessors, microcontrollers or the like that are programmable using software and/or firmware (e.g., microcode). Any suitable microprocessor may be used, for example, a microprocessor including a complex instruction set computing (CISC) architecture, e.g., an x86 processor, or processor having a reduced instruction set computing (RISC) architecture, for example, an ARM processor. SSI 716 may be part of a microprocessor or separate therefrom. In embodiments in which a microprocessor is employed, any suitable OS may be used to operate the microprocessor, including, for example, a Linux operating system. In some embodiments, the combination of software, hardware and/or firmware may constitute a system-on-chip (SOC) or system-on-module (SOM) on which SSI 716 may be implemented, e.g., as part of a SmartNIC. For example, in some embodiments, SSI 716 may be implemented, at least in part, using a BlueField™ Multicore System On a Chip (SOC) for NVMe storage, available from Mellanox, which may be further configured with logic and functionality described herein to constitute a SmartNIC.

Returning to FIG. 6, the FDI 606 and one or more of physical storage devices 624 may be configured to exchange IO communications in accordance with NVMe. Accordingly, FDI 606 may include an NVMe controller, e.g., at least similar to the NVMe controller 708, configured to exchange IO communication according to NVMe with physical storage devices 624. Further, FDI 606 may be configured with the same or similar functionality as SSCI 729. For example, SSCI 729 may include: logic for steering and routing IO communications to one or more of its ports physically connected to internal fabric 630, logic implementing lower-level processing (e.g., at the transport, data link and physical layer) of IO communications, including RDMA and messaging communications; logic for encapsulating IO communications to be sent from FDI 606 over internal fabric 630 to SSI 616, including RDMA and command messaging communications, in accordance with NVMeoF; logic for de-capsulating NVMeoF command capsules received from internal fabric 630, the decapsulated communication to be configured in accordance with NVMe for use by an NVMe controller of the FDI 606 for exchanging IO communications with physical storage devices 624.

The FDI 606 may be implemented as a combination of software, firmware and/or hardware including, for example, any combination of a printed circuit board (PCB), FPGA, ASIC, or the like, that are hardwired to perform certain functionality, and may include one or more microprocessors, microcontrollers or the like that are programmable using software and/or firmware (e.g., microcode). Any suitable microprocessor may be used, for example, a microprocessor including a complex instruction set computing (CISC) architecture, e.g., an x86 processor, or processor having a reduced instruction set computing (RISC) architecture, for example, an ARM processor. In some embodiments, the combination of software, hardware and/or firmware may constitute a system-on-chip (SOC) or system-on-module (SOM) on which FDI 606 may be implemented. For example, in some embodiments, the FDI 606 may be implemented using a BlueField™ Multicore SOC for NVMe storage, available from Mellanox.

The systems and data structures described in relation to FIGS. 1-7 may be used to implement using SSM as host memory according to embodiments of the invention, as will now be described in more detail.

FIG. 8 is a block diagram illustrating an example of a system 800 for using SSM as host memory, according to embodiments of the invention. Other embodiments of a system for using SSM as host memory, for example, variations of system 800, are possible and are intended to fall within the scope of the invention. The system 800 may be implemented using one or more components of the storage network 600 and/or the host system 700, as described in more detail elsewhere herein.

The system 800 may include one or more host systems 802, 850 and a storage system 820. Each of host systems 802, 850 may be implemented using one or more components of the host system 700, and the storage system 820 may be implemented using one or more components of the storage system 620a.

The host system 802 may include any of: one or more applications 804; OS 806 (e.g., 701); main memory 808 (e.g., DRAM); SSI 816; and other components. The SSI 816 may be implemented using one or more components of the SSI 616 and/or may be configured to implement any functionality of the SSI 816 described herein. The SSI 816 may be directly connected to the internal fabric 830 (e.g., 630) of the storage system 830, and be configured to directly communicate with global memory (GM) 840 without use of any directors and/or other compute resources of the storage system 820. The SSI 816 may be configured to communicate directly with GM 840 using RDMA technology.

The storage system 820 may include the internal fabric 830, GM 840 and memory management module 832. The GM 840 may include a plurality of memory portions 842a-b. In some embodiments, the GM 840 may include portions that are mirrored and portions that are not mirrored—i.e., one or more portions 842a-b may be mirrored and one or more portions 842a-b may be unmirrored. Data stored in mirrored portions may be copied to other portions of the GM (e.g., a GM segment of another processing node), and data stored in unmirrored portions may not be copied. In some embodiments, only mirrored GM portions are allocated for use as host memory for data protection, whereas in other embodiments, unmirrored data portions may be used, for example when other forms of data protection are relied upon, for example, vaulting or if allocated memory portions are non-volatile memory (e.g., flash memory).

In some embodiments, pools of the GM portions 842a-b are made available for use as host memory, and other pools of the GM portions 842a-b are not made available. The GM portions made available for use as host memory may be comprised of sub-portions of predefined size, and these predefined sizes may vary (e.g., 128K, 64K, 16K and 8K). In some embodiments, the GM portions 842a-b and/or pools of the GM portions may be organized and allocated or use as host memory according to the size of their constituent sub-portions. For example, each sub-portion of a GM portion made available for use as host memory may be of a same predefined size, or each GM portion (i.e., all sub-portions thereof) of a pool may be of a same predefined size.

In some embodiments, the GM portions 842a-b and/or pools of GM portions are organized and allocated for use as host memory according to whether the sub-portions or GM portions thereof, respectively, are mirrored or unmirrored. For example, a GM portion may be defined to only include sub-portions that are mirrored, or only include sub-portions that are unmirrored; and/or a pool of GM portions may be defined to only include GM portions that are mirrored, or only include GM portions that are unmirrored. In some embodiments, the GM portions 842a-b and/or pools of GM portions may be organized and allocated or use as host memory based on: 1) whether the sub-portions or GM portions thereof, respectively, are mirrored or unmirrored; and 2) the predefined size of the sub-portions or GM portions thereof, respectively. For example, a GM portion may be defined to include only sub-portions that are mirrored and are 128K in size; and/or another GM portion may be defined to include only sub-portions that are unmirrored and are 16K in size. Similarly, a pool of GM portions may be defined to include only GM portions that are mirrored and are 64K in size; and/or another pool may be defined to include only GM portions that are unmirrored and are 8K in size.

In some embodiments, portions of a cache of the GM 840, which are typically used for caching a part of an IO operations, may be allocated for use as host memory; i.e., one or more of the memory portions 842a-b are cache portions. In such embodiments, cache portions and/or pools of cache portions may be organized and allocated for use as host memory based on: 1) whether the constituent cache slots of the cache portion or constituent cache portions of the cache pool, respectively, are mirrored or unmirrored; and/or 2) the predefined size of the constituent cache slots or cache portions thereof, respectively. For example, in some embodiments, cache slot pools and cache portions (including cache slots) may be organized as described in U.S. patent application Ser. No. 16/709,013, titled "Cache Memory Management" to Coventry et al., filed Dec. 10, 2019 (hereinafter "Coventry"), the entire contents of which are hereby incorporated by reference.

The sizes of memory sub-portions (e.g., cache slots), memory portions 842a-b (e.g., cache portions) and/or pools of GM portions (e.g., cache pools) of mirrored or unmirrored type may be dynamically increased or decreased, for example, using techniques the same as or similar to techniques described in Coventry. Such dynamic changes may be made based on the needs or desires of one or more applications and/or host systems, for example, by a storage system administrator in response to instructions or requests from a host system administrator, or be made automatically in response to a communication received from a host system (e.g., 802 or 850). In some embodiments, such dynamic changes may be made based on predicted workloads of a host system and/or one or more applications executing thereon, for example, as described in Coventry.

The memory management module 832 may be configured to manage aspects of the GM 840, including the dynamic sizing of the memory sub-portions, memory portions and pools of memory portions. The memory management module 832 may be configured to monitor host memory accesses to the portions 842*a-b* and to adjust the sizes of memory sub-portions, memory portions and/or pools of memory (e.g., of mirrored and unmirrored type) based on past workloads. The memory management module 832 may be configured to perform prediction algorithms based on past workloads determined from monitoring host memory accesses to the portions 842*a-b*, and dynamically adjust such sizes accordingly.

The memory management module 832 and/or other components of the storage system 820 may be configured to allocate the memory portions 842*a-b* to one or more of the host systems 802, 850. For example, the memory management module 832 may be configured to allocate memory portions in response to instructions received by a storage system administrator, or in response to an instruction received from the host system 802, e.g., from a host OS of the host system 802, which may be received through the SSI 816. The memory management module 832 may be configured to allocate one or more memory portions 842*a-b* for the exclusive use of one host system, and may be configured to allocate one or more memory portions 842*a-b* for shared use between multiple host systems. It may be desirable to share memory portions for a distributed application (e.g., a distributed database) that is distributed across multiple host systems. The memory management module 832 may be configured to communicate these allocations (and changes to same) to the one or more host systems. Such communications may be communicated through the SSI 816 to the OS 806, for example, using SSI components and functionality described in relation to the SSI 616. In some embodiments, the SSI 816 includes memory management logic 820 that may communicate SSM allocations to the OS 806. The memory management module 820 may be configured to implement one or more of the memory management functions described herein, for example, those functions described as being performed by the memory management module 832. The memory management logic 820 may be embodied as software, firmware or hardware, or a combination thereof.

The host OS 806 of the host system may be configured to utilize allocated SSM (e.g., one or more portions 842*a-b* of the GM 840) as host memory. For example, the host OS 806 may be configured to utilize allocated portions of SSM as an extension of main memory 808, for example as T2 memory, which may be persistent memory (i.e., the allocated portions may be persistent memory as described in more detail elsewhere herein. In response to executing the one or more applications 804, the host OS 806 may send memory instructions through the SSI 816 and over the internal fabric 830 to the allocated portions of the GM 840. For example, the OS 806 may initiate one or more RDMA (e.g., RDMA read or RDMA write) instructions to the GM 840. The RDMA may be a read instructions or a write instruction.

The SSI 816 may include memory mapping logic 818, which may be configured to handle host memory instructions issued to the GM 840 by the host system 802, e.g., by the host OS 806. For example, the memory mapping logic 818 may be configured to process memory instructions between the host OS 806 and the GM 840, including sending RDMA communications directly across the internal fabric 830 to the GM 840 (i.e., without use of a director of other computational component of the storage system), and receiving RDMA responses across the internal fabric 830 directly from the GM 840. The memory mapping logic 818 may be configured to utilize components described in relation to the SSI 716 to process memory instructions between the host system 802 and the global memory 840. For example, the memory mapping logic may utilize RDMA logic 725 to process RDMA operations, and to use atomic logic 726 as described in more detail elsewhere herein to help maintain memory coherency when processing memory instructions for memory portions 842*a-b* that are shared between host systems.

FIG. 9 is a flowchart illustrating an example of a method 900 of using SSM as host memory, according to embodiments of the invention. Other embodiments of a method of using SSM as host memory, for example, variations of method 900, are possible and are intended to fall within the scope of the invention.

In a step 902, an instruction or request for SSM to be allocated for use as host memory may be received, for example, as described in more detail elsewhere herein, and one or more portions of the SSM may be allocated of such use in a step 904. Such memory may be allocated for exclusive use or shared use, as described in more detail elsewhere herein. Further, such allocations may be changed—e.g., the size and/or type of allocation may be changed dynamically—as described in more detail herein, for example, based on monitored workload, prediction and/or instructions received from a user (e.g., storage system administrator) or from a host system. In a step 906, the allocation of the portions may be communicated to the host system, for example, as described in more detail elsewhere herein.

In a step 908, the host system may send a memory instruction to the SSM, as described in more detail elsewhere herein. For example, the host system may initiate an RDMA read or write operation that is sent directly to the SSM across an internal fabric of the host system, e.g., without use of any director or other compute resource of the storage system, as described in more detail elsewhere herein. Such operations may be communicated as atomic operations if the memory portions of the SSM addressed by the operations are shared between multiple host systems.

In a step 910, the memory instruction may be executed on the SSM, i.e., on the one or more memory portions of the SSM allocated for use as host memory that are addressed by the instructions. For example, data may be read from or written to the one or more memory locations. If the memory instruction is a write operation, the written information may be mirrored to another corresponding memory portion on the storage system in a step 912. In the event of a failure of the mirrored location, the mirroring portion may be used in place of the failed mirrored portion. Further, if vaulting is implemented for the SSM, then, in the event of a failure of the SSM or any other component of the storage system in whose fault zone the SSM resides, the data stored in the SSM may be copied to a physical storage location, and the data restored to the SSM when the system or other component is restored, as described in more detail elsewhere herein.

It should be appreciated that the host system may be configured to compress a data portion according to the compression metadata for the data portion (or LSU thereof), and to write the compressed data portion to storage system. The IO processing logic 717, SSCI 729 or a combination thereof may be configured to perform such compression. The data portion may be compressed as part of performing a write operation as described in relation to the step 810 of the method 800 and/or as described in connection with the timing diagram of FIG. 9. In some embodiments, a write instruction may be sent from the SSI to a director 637, whereas, in other embodiments, a write instruction may be sent directly from the SSI 716 to the cache 642 or one or more physical storage devices 624.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including method 900, or parts thereof, may be implemented using one or more of the systems and/or data structures described in relation to FIGS. 1-8, or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, any suitable combination thereof.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a data storage network including a data storage system and one or more host systems on which a plurality of applications execute, the data storage system including a memory, a method comprising:

allocating a first portion of the memory for use as host memory by a first of the one or more host systems, wherein the first portion of the memory is included in a global memory of the data storage system and wherein, prior to said allocating, the first portion is used for one or more data storage system internal operations including caching data of I/O operations received at the data storage system;

sending a communication to the first host system informing the first host system that the first portion is available for use by the first host system as host memory;

sending a memory instruction, that is initiated by and originates from the first host system, from a storage system interface of the first host system to the memory via a direct connection to an internal switching fabric of the data storage system, wherein the memory is connected to the internal switching fabric and wherein the memory instruction accesses the first portion of the memory to perform an operation for a first data, wherein the storage system interface of the first host directly sends the memory instruction to the memory over the direct connection and the internal switching fabric without using one or more directors or other compute resources of the data storage system, wherein the internal switching fabric is internal within the data storage system and is used for internal communications between components of the data storage system, wherein the components of the data storage system include the one or more directors and the memory that is connected to the internal switching fabric, and wherein the storage system interface is physically directly connected over the direct connection to the internal switching fabric of the data storage system, wherein the first host system uses the direct connection to the internal switching fabric to directly communicate with the memory to send the memory instruction and access the first portion of the memory of the data storage system; and executing the memory instruction, that is initiated by and originates from the first host system, on the first portion for the first data.

2. The method of claim 1, further comprising:

the memory of the data storage system receiving a remote direct memory access request from the first host system over the direct connection, the remote direct memory access request including the memory instruction for the first data.

3. The method of claim 1, wherein said sending sends the memory instruction directly from the storage system interface over the direct connection to the internal switching fabric independent of IO protocol.

4. The method of claim 1, further comprising:

mirroring the first data on the data storage system.

5. The method of claim 1, further comprising:

allocating a second portion of the first memory for use as host memory by a second of the one or more host systems.

6. The method of claim 5, wherein execution of a first application is distributed across a plurality of host systems, including the first host system and the second host system,
wherein the first data is data resulting from execution of the first application, and
wherein the method further comprises:
storing second data in the second portion of memory, wherein the second data results from execution of the first application on the second host system.

7. The method of claim 1, further comprising:
dynamically modifying an amount of the memory allocated for use as host memory by the first host system.

8. For a data storage network including a data storage system and one or more host systems on which a plurality of applications execute, the data storage system including a memory, a system comprising:
a data storage system including memory; and
executable logic that implements a method including:
allocating a first portion of the memory for use as host memory by a first of the one or more host systems, wherein the first portion of the memory is included in a global memory of the data storage system and wherein, prior to said allocating, the first portion is used for one or more data storage system internal operations including caching data of I/O operations received at the data storage system;
sending a communication to the first host system informing the first host system that the first portion is available for use by the first host system as host memory;
sending a memory instruction, that is initiated by and originates from the first host system, from a storage system interface of the first host system to the memory via a direct connection to an internal switching fabric of the data storage system, wherein the memory is connected to the internal switching fabric and wherein the memory instruction accesses the first portion of the memory to perform an operation for a first data, wherein the storage system interface of the first host directly sends the memory instruction to the memory over the direct connection and the internal switching fabric without using one or more directors or other compute resources of the data storage system, wherein the internal switching fabric is internal within the data storage system and is used for internal communications between components of the data storage system, wherein the components of the data storage system include the one or more directors and the memory that is connected to the internal switching fabric, and wherein the storage system interface is physically directly connected over the direct connection to the internal switching fabric of the data storage system, wherein the first host system uses the direct connection to the internal switching fabric to directly communicate with the memory to send the memory instruction and access the first portion of the memory of the data storage system; and
executing the memory instruction, that is initiated by and originates from the first host system, on the first portion for the first data.

9. The system of claim 8, wherein the method further includes:
the memory of the data storage system receiving a remote direct memory access request from the first host system over the direct connection, the remote direct memory access request including the memory instruction for the first data.

10. The system of claim 8, wherein said sending sends the memory instruction directly from the storage system interface over the direct connection to the internal switching fabric independent of IO protocol.

11. The system of claim 8, wherein the method further includes:
mirroring the first data on the data storage system.

12. The system of claim 8, wherein the method further includes:
allocating a second portion of the first memory for use as host memory by a second of the one or more host systems.

13. The system of claim 12, wherein execution of a first application is distributed across a plurality of host systems, including the first host system and the second host system,
wherein the first data is data resulting from execution of the first application, and
wherein the method further includes storing second data in the second portion of memory, wherein the second data results from execution of the first application on the second host system.

14. The system of claim 8, wherein the method further includes:
dynamically modifying an amount of the memory allocated for use as host memory by the first host system.

15. For a data storage network including a data storage system and one or more host systems on which a plurality of applications execute, the data storage system including a memory, non-transitory computer-readable media having software stored thereon, the software comprising:
executable code that allocates a first portion of the memory for use as host memory by the first host system, wherein the first portion of the memory is included in a global memory of the data storage system and wherein, prior to allocating the first portion for use as host memory by the executable code that allocates, the first portion is used for one or more data storage system internal operations including caching data of I/O operations received at the data storage system;
executable code that sends a communication to the first host system informing the first host system that the first portion is available for use by the first host system a host memory;
executable code that sends a memory instruction, that is initiated by and originates from the first host system, from a storage system interface of the first host system to the memory via a direct connection to an internal switching fabric of the data storage system, wherein the memory is connected to the internal switching fabric and wherein the memory instruction accesses the first portion of the memory to perform an operation for a first data, wherein the storage system interface of the first host directly sends the memory instruction to the memory over the direct connection and the internal switching fabric without using one or more directors or other compute resources of the data storage system, wherein the internal switching fabric is internal within the data storage system and is used for internal communications between components of the data storage system, wherein the components of the data storage system include the one or more directors and the memory that is connected to the internal switching fabric, and wherein the storage system interface is physically directly connected over the direct connection to the internal switching fabric of the data storage system, wherein the first host system uses the direct connection to the internal switching fabric to directly communicate with the memory to send the memory instruction and access the first portion of the memory of the data storage system; and executable code that executes the memory instruction, that is initiated by and originates from the first host system, on the first portion for the first data.

16. The non-transitory computer-readable media of claim 15, the software further comprising:

executable code that controls the memory of the data storage system receiving a remote direct memory access request from the first host system over the direct connection, the remote direct memory access request including the memory instruction for the first data.

17. The non-transitory computer-readable media of claim 15, wherein said sending sends the memory instruction directly from the storage system interface over the direct connection to the internal switching fabric independent of IO protocol.

18. The non-transitory computer-readable media of claim 15, the software further comprising:

executable code that mirrors the first data on the data storage system.

19. The non-transitory computer-readable media of claim 15, the software further comprising:

executable code that allocates a second portion of the first memory for use as host memory by a second of the one or more host systems.

20. The non-transitory computer-readable media of claim 15, the software further comprising:

executable code that dynamically modifies an amount of the memory allocated for use as host memory by the first host system.

* * * * *